US007664591B2

(12) United States Patent
Nakagawa et al.

(10) Patent No.: US 7,664,591 B2
(45) Date of Patent: Feb. 16, 2010

(54) ENGINE CONTROL APPARATUS

(75) Inventors: Shinji Nakagawa, Hitachinaka (JP); Kozo Katogi, Hitachi (JP); Minoru Oosuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 49 days.

(21) Appl. No.: 11/476,798

(22) Filed: Jun. 29, 2006

(65) Prior Publication Data

US 2007/0016357 A1 Jan. 18, 2007

(30) Foreign Application Priority Data

Jul. 1, 2005 (JP) ............................ 2005-194179

(51) Int. Cl.
*G06F 19/00* (2006.01)
*G06G 7/70* (2006.01)

(52) U.S. Cl. ...................................... 701/104; 701/113

(58) Field of Classification Search ......... 701/103–105, 701/113; 123/478, 480, 491, 179.4, 179.16; 73/114.52, 114.53, 114.72

See application file for complete search history.

(56) References Cited

U.S. PATENT DOCUMENTS

| | | | | |
|---|---|---|---|---|
| 4,845,630 | A * | 7/1989 | Stephens | 701/123 |
| 5,263,455 | A | 11/1993 | Iwai et al. | |
| 5,492,101 | A | 2/1996 | Saito et al. | |
| 5,629,853 | A * | 5/1997 | Ogawa et al. | 701/103 |
| 5,992,389 | A * | 11/1999 | Ohsaki | 123/478 |
| 6,314,944 | B1 | 11/2001 | Majima | |
| 6,418,780 | B1 * | 7/2002 | Chon | 73/23.32 |
| 6,644,274 | B2 * | 11/2003 | Hasegawa et al. | 123/406.41 |
| 7,140,241 | B2 * | 11/2006 | Wakahara | 73/118.1 |
| 7,272,485 | B2 * | 9/2007 | Amano et al. | 701/104 |

FOREIGN PATENT DOCUMENTS

| | | |
|---|---|---|
| DE | 195 39 536 A1 | 4/1996 |
| EP | 1 433 939 A2 | 6/2004 |
| JP | 7-27010 A | 1/1995 |
| JP | 8-177556 A | 7/1996 |
| JP | 2001-107795 A | 4/2001 |

OTHER PUBLICATIONS

European Search Report dated Nov. 20, 2006.
Chinese Office Action dated May 9, 2008 together with an English translation.

* cited by examiner

*Primary Examiner*—Stephen K Cronin
*Assistant Examiner*—Johnny H Hoang
(74) *Attorney, Agent, or Firm*—Crowell & Moring LLP

(57) ABSTRACT

An apparatus and a method of control of the engine for separating and detecting the fuel remaining in the engine and in the intake passages before the start of the engine and also detecting the fuel property, and calculating a parameter such as an optimum fuel injection quantity when the engine is started, and thus enabling an efficient exhaust performance and a good running performance to be compatible at start-up. The engine control apparatus has a unit for detecting or estimating a burned fuel quantity of the engine, and a unit for separating and detecting a burned fuel quantity supplied from the fuel injection valve and a burned quantity of fuel other than the fuel supplied from the injection valve.

32 Claims, 21 Drawing Sheets

< CALCULATING UNIT OF BASIC FUEL INJECTION QUANTITY 121 >

< DECISION UNIT FOR PERMISSION TO DETECT FIRST EVAPORATION RATE 130 >

< CALCULATING UNIT OF ENGINE REVOLUTION INCREASE INDEX 140 >

< DETECTING UNIT OF FIRST EVAPORATION RATE 150 >

< DECISION UNIT FOR PERMISSION TO DETECT SECOND EVAPORATION RATE 160 >

< CALCULATING UNIT OF AIR-FUEL RATIO F/B CORRECTION AMOUNT 123 >

< CALCULATING UNIT OF AIR-FUEL RATIO CORRECTION AMOUNT 122 >

< CALCULATING UNIT OF FREQUENCY RESPONSE CHARACTERISTIC 170 >

< DETECTING UNIT OF SECOND EVAPORATION RATE 180 >

< DETECTING UNIT OF RESIDUAL FUEL AMOUNT AND FUEL PROPERTY 190 >

< CALCULATING UNIT OF DIFFERENCE IN AIR-FUEL RATIO AT INLET AND OUTLET 210 >

< DETECTING UNIT OF FIRST EVAPORATION RATE 250 >

< CALCULATING UNIT OF HISTORY DURING STOPPAGE TIME 310 >

< DETECTING UNIT OF RESIDUAL FUEL QUANTITY AND FUEL PROPERTY 190 >

< DETECTING UNIT OF RESIDUAL FUEL QUANTITY AND FUEL PROPERTY 390' >

ENGINE CONTROL APPARATUS

BACKGROUND OF THE INVENTION

The present invention relates to an engine control apparatus, and more preferably to an engine control apparatus adapted to detect fuel property and a residual fuel quantity in an engine and control the engine optimally on the basis of detected information.

As the emission regulations on automobile engines being tightened in Japan, North America and Europe in recent years, there has been requirement for greater improvement in the emission performance (exhaust emission characteristics) of the engines. With the emergence of high-performance catalysts and the remarkable advances in precision in catalyst control, the exhaust emission is discharged in largest quantities from the engine chiefly when the engine is started. On the other hand, when the engine is at rest, a certain amount of fuel is left behind in the intake passages and the cylinders (engine). The fuel which leaks from the fuel injection valve while the engine is at rest remains in the intake passage and the cylinder. Because the residual fuel burns together with fuel supplied from the fuel injection valve when the engine is started, the residual fuel acts as a disturbance to start-up control, and degrades the emission performance.

Generally, fuels show a certain extent of variation in their property, and the evaporation rate at low temperature varies with their properties. Since the optimum fuel quantity at engine start-up changes with different fuel evaporation rates, a number of methods have been proposed for fuel property detection, but in most of those methods, the fuel property is detected during a start-up of the engine from a point of view of early-stage detection. Here again, the residual fuel is a major disturbance to detection of fuel property.

In Patent Document JP-A-7-27010, there is disclosed an engine control apparatus which detects a change rate ΔNe of engine revolution speed, and determines the heaviness of fuel based on ΔNe and charge efficiency with reference to a map made up of water temperature, intake air temperature, and atmospheric pressure. This control apparatus operates on a principle that by detecting ΔNe, namely, a combustion torque, a fuel evaporation rate (burned fuel quantity or air-fuel ratio in combustion) is obtained, and a fuel property is detected indirectly according to the fuel evaporation rate.

Patent Document JP-A-8-177556 reveals a control apparatus in which an evaporation time constant τ representing a temporal change in fuel quantity sucked from the inlet system into the cylinder (combustion chamber) of the engine is calculated based on an evaporation rate time constant τ0 at a reference engine revolution speed and a reference engine load.

In this control apparatus, there is proposed a method, which applies low load to the computer dedicated to control, for calculating with high precision a fuel remaining in the intake port without being sucked in the combustion chamber when the fuel is injected during engine operation.

Further, the Patent document JP-A-2001-107795 discloses a control apparatus which determines a fuel property on the basis of a relation between a fuel injection quantity or a parameter correlated with the fuel injection quantity and a fuel combustion quantity or a parameter correlated with the fuel burned quantity when a predetermined condition is established (during idle operation, for instance).

SUMMARY OF THE INVENTION

According to JP-A-7-27010, as described above, because the residual fuel existing in the intake passage and the cylinder burns together with fuel supplied from the fuel injection valve at the start of the engine, the burned fuel quantity or the air-fuel ratio in combustion changes according to the residual fuel quantity. Therefore, the fuel evaporation rate apparently is changed according to this residual fuel quantity, which results in a detection error, in other words, a misdetection of the fuel property.

JP-A-8-177556 mentioned above indicates that this technology does not detect the quantity of fuel already existing in the cylinder or the intake passage before the engine is started, and is unable to solve the above-described problem.

According to the control apparatus disclosed in JP-A-2001-107795, the fuel combustion quantity is detected chiefly based on the A/F ratio detected from the exhaust gas and this detection occurs following passage of a certain period of time after the engine is started during idle operation, for example, as described above. The fuel remaining in the intake passage or cylinder before start-up of the engine, of which a question was raised, is burned in a short time after the engine is started, and this detection is conducted after passage of a certain length of time from the time when the engine is started. Therefore, the fuel property can be detected under conditions less likely to be affected by the residual fuel, but the residual fuel quantity cannot be detected either positively or quantitatively. When the engine is started next time, a fuel injection quantity at start-up of the engine is determined with effects of the residual fuel ignored, with the result that the air-fuel ratio in combustion changes by an amount of the residual fuel and the emission performance during a start-up deteriorates.

The present invention has been made with the foregoing circumstances taken into consideration, and has as its object to provide an engine control apparatus capable of setting a parameter such as an optimum fuel injection quantity at the start of the engine by separating and detecting a fuel and its property remaining in the intake passage and the cylinder before the engine is started and thus make the emission performance and the running performance during start-up compatible.

To achieve the above object, according to an aspect of the present invention, the control apparatus comprises means of detecting or estimating a burned fuel quantity of an engine; means for separating the detected estimated burned fuel quantity and separately detecting a burned fuel quantity of fuel supplied from a fuel injection valve and a burned quantity of fuel other than the burned fuel quantity supplied from the fuel injection valve. (Refer to FIG. 1)

In other words, a detected or estimated burned fuel quantity of the engine is separated into a burned fuel quantity supplied from the fuel injection valve and a burned quantity of fuel other than the burned fuel quantity supplied from the fuel injection valve and separate combustion fuel quantities are detected to make it possible to detect the condition of the fuel combustion system with high accuracy.

According to a second aspect of the control apparatus of the present invention, the burned fuel quantity detecting or estimating means includes a first detecting means for detecting an initial burned fuel quantity or a fuel evaporation rate; and a second detecting means for detecting a second burned fuel quantity or a fuel evaporation rate, and wherein the separating and detecting means includes means for estimating a burned quantity of fuel other than a fuel supplied from the fuel injection valve on the basis of detection results from the first and second detecting means. (For second to fourth aspects, refer to FIG. 2)

More specifically, the means for separating and detecting a burned fuel quantity supplied from the fuel injection valve and a burned quantity of fuel other than a fuel supplied from the fuel injection valve includes, for example, a first (a burned fuel quantity or a fuel evaporation rate) detecting means for detecting a burned fuel quantity including both a burned fuel quantity supplied from the fuel injection valve and a burned quantity of fuel other than the fuel supplied from the fuel injection valve, and a second (a burned fuel quantity or a fuel evaporation rate) detecting means for detecting only a burned fuel quantity supplied from the fuel injection valve, wherein a burned quantity of fuel other than a fuel supplied from the fuel injection valve is obtained from, for example, a difference between detection results (detected values, for example) of both detecting means.

According to a third aspect of the control apparatus of the present invention, the separating and detecting means is adapted to estimate a burned quantity of fuel other than a fuel supplied from the fuel injection valve on the basis of a difference or ratio between detection results of the first and second detecting means.

More specifically, the description of the second aspect applies to the third aspect, for example, the separating and detecting means includes a first (a burned fuel quantity or a fuel evaporation rate) detecting means for detecting a burned fuel quantity including both a burned fuel quantity supplied from the fuel injection valve and a burned quantity of fuel other than a fuel supplied from the fuel injection valve and a second (a burned fuel quantity or a fuel evaporation rate) detecting means for detecting only a burned fuel quantity supplied from the fuel injection valve, wherein a burned quantity of fuel other than a fuel supplied from the fuel injection valve is obtained on the basis of a difference or a ratio between detection results (detected values, for example) of both detecting means.

According to a fourth aspect of the control apparatus of the present invention, the separating and detecting means is adapted to detect a residual fuel quantity existing in a cylinder, an air-intake passage, and exhaust passage before the engine is started as a burned quantity of fuel other than a fuel supplied from the fuel injection valve.

According to a fifth aspect of the control apparatus of the present invention, the separating and detecting means includes means for estimating a fuel property on the basis of a detection result of the first or second detecting means. (Refer to FIG. 3.)

To be more specific, the description of the second aspect of the invention is equally applicable to the fifth aspect, for example, the separating and detecting means includes a second (a burned fuel quantity or a fuel evaporation rate) detecting means for detecting only a burned fuel quantity supplied from the fuel injection valve, and an amount of change in the burned fuel quantity or the evaporation rate in this case is obtained from the fuel property not of the residual fuel but of the fuel supplied from the fuel injection valve.

According to a sixth aspect of the control apparatus of the present invention, the separating and detecting means is adapted to obtain a fuel property on the basis of the second fuel evaporation rate when the second fuel evaporation rate is lower than the first fuel evaporation rate, and obtains a residual fuel quantity on the basis of a difference or a ratio between the first fuel evaporation rate and the second fuel evaporation rate. (Refer to FIG. 4.)

More specifically, the description of the second aspect is equally applicable to the sixth aspect, for example, when the separating and detecting means includes means for a first (a burned fuel quantity or a fuel evaporation rate) detecting means for detecting a burned fuel quantity including both a burned fuel quantity supplied from the fuel injection valve and a burned quantity of fuel other than the fuel supplied from the fuel injection valve, a second (a combustion quantity and a fuel evaporation rate) detecting means for detecting only the burned fuel quantity supplied from the fuel injection valve, the separating and detecting means obtains a residual fuel quantity as the burned quantity of fuel other than the fuel supplied from the fuel injection valve on the basis of a difference or a ratio between detection results (detected values, for example) from both detecting means.

According to a seventh aspect of the control apparatus of the present invention, the control apparatus further comprises means for calculating a parameter related to engine control on the basis of a detection result of the separating and detecting means. (Refer to FIG. 5)

In other words, a residual fuel quantity is separated out, and this residual fuel quantity and a fuel property, which have effects on the exhaust performance and the running performance during start-up, are detected according to the foregoing aspects, and on the basis of detection results, a parameter related to engine control, such as a burned fuel quantity during start-up of the engine, is optimized.

According to an eighth aspect of the control apparatus of the present invention, a period where a detection result is affected by both changes in burned fuel quantity caused by the residual fuel and changes in burned fuel quantity caused by the fuel property is used as a detection period, and the second detecting means is adapted to use a period where there are effects of change in burned fuel quantity caused by the fuel property as a detection period. (For the eighth to 18th aspects, refer to FIG. 6.)

More specifically, since the residual fuel left in the engine before start-up is burned in a short time after the engine is started, detection results by the first detecting means obtained during a predetermined time after the start-up of the engine include both a burned fuel quantity supplied from the fuel injection valve and a burned quantity of fuel other than the fuel supplied from the fuel injection valve (a residual fuel quantity). On the other hand, detection results by the second detecting means obtained after passage of a predetermined time from the start-up of the engine are not affected by the residual fuel quantity but affected only by the burned quantity of fuel supplied from the fuel injection valve, in other words, by its fuel property. In this manner, burned fuel quantities are detected in different periods where degrees of effects of effect factors are different, and by comparing detection results, the effects of the residual fuel and the effects of the fuel property are separated.

According to a ninth aspect of the control apparatus of the present invention, the first detecting means detects a burned fuel quantity or a fuel evaporation rate during a passage of a predetermined time after the start of the engine and the second fuel evaporation rate detecting means detects a burned fuel quantity or a fuel evaporation rate after passage of a predetermined time after the engine is started.

More specifically, the description of the eighth aspect is equally applicable to to the ninth aspect.

According to a tenth aspect of the control apparatus of the present invention, the first detecting means detects a burned fuel quantity or a fuel evaporation rate when an engine cooling water temperature is less than or equal to a predetermined temperature A, and the second detecting means detects a burned fuel quantity or a fuel evaporation rate when the cooling water temperature is less than or equal to a predetermined cooling water temperature B.

To be more specific, because a difference in the evaporation rate caused the fuel property occurs at a predetermined temperature (at a cooling water temperature of 60° C. or less, for example), the temperature is indicated in the detecting conditions.

According to an eleventh aspect of the control apparatus of the present invention, in the first and second detecting means, the moment the engine is started, which is a start point of measuring an elapse time, is set at a time point when the engine speed is greater than zero.

More specifically, the above description clearly states that the start of the engine is not at a time of initial combustion or complete combustion, but the moment the engine has shifted from stopped to unstopped state.

According to a twelfth aspect of the control apparatus of the present invention, the first or second detecting means is adapted to detects a burned fuel quantity or a fuel evaporation rate on the basis of the engine speed. (For the twelfth and 13th aspects, refer to FIG. 7.)

More specifically, the above description clearly indicates that by detecting the engine speed, namely, the combustion torque, a fuel evaporation rate (burned fuel quantity or air-fuel ratio in combustion) is obtained.

According to a 13th aspect of the control apparatus of the present invention, the first or second detecting means detects a burned fuel quantity or a fuel evaporation rate on the basis of an exhaust component of the engine.

More specifically, the above description clearly states that by detecting an exhaust component, a fuel evaporation rate (a burned fuel quantity or an air-fuel ratio in combustion) is obtained.

According to a 14th aspect of the control apparatus of the present invention, the first detecting means is adapted to detect a burned fuel quantity or a fuel evaporation rate on the basis of time T0 from when the engine speed becomes greater than or equal to a predetermined value C until the engine speed becomes greater than or equal to a predetermined value D. (For the 14th to 22nd aspects, refer to FIG. 8).

To be more specific, the description of the eighth aspect is equally applicable to the description of the eighth aspect. Because the residual fuel left in the cylinder or the like before start-up is burned in a short time after start-up of the engine, detection by the first detecting means that occurs during a predetermined time after start-up of the engine is based on time T0 from when the engine speed becomes greater than or equal to a predetermined value C until the engine speed becomes greater than or equal to a predetermined value D. In this case, the predetermined value C may be a value a little larger than an engine speed obtained by a starter motor, for example, namely, an engine speed attained by a so-called initial combustion, and the predetermined value D may be a value corresponding to complete combustion (1000 rpm), for example.

According to a 15th aspect of the control apparatus of the present invention, the first detecting means detects a burned fuel quantity or a fuel evaporation rate on the basis of time T1 from initial combustion of the engine until the engine reaches a predetermined number of engine revolutions.

More specifically, descriptions of the eighth and 14th aspects are applicable to the 15th aspect. It is clearly described that the residual fuel left in the cylinders or the like is burned in a short time after the start of the engine and therefore detection by the first detecting means in a predetermined time after the start of the engine is carried out on the basis of time T1 from initial combustion of the engine until a predetermined number of engine revolutions is reached.

According to a 16th aspect of the control apparatus of the present invention, the first detecting means detects a burned fuel quantity or a fuel evaporation of the engine on the basis of time T2 from initial combustion of the engine until the engine speed settles in a predetermined range and becomes stable.

More specifically, descriptions of the eighth aspect and the 14th aspect are applicable to the 16th aspect. It is clearly described that the residual fuel left in the cylinders or the like before start-up is burned in a short time after the start of the engine and therefore detection by the first detecting means is carried out during a predetermined time after the start of the engine on the basis of time T2 from initial combustion of the engine until the engine speed settles into a predetermined range and becomes stable.

According to a 17th aspect of the control apparatus of the present invention, the second detecting means detects a burned fuel quantity or a fuel evaporation rate after the engine speed reaches a predetermined number of revolutions after the initial combustion of the engine occurred.

More specifically, description of the eighth aspect is applicable to the 17th aspect. The residual fuel left in the engine before start-up is burned in a short time after the start of the engine and therefore a result of detection by the first detecting means in a predetermined time after the start of the engine includes both a burned fuel quantity supplied from the fuel injection valve and a burned quantity of fuel other than the fuel supplied from the fuel injection valve (a residual fuel quantity). On the other hand, a result of detection by the second detecting means performed after passage of a predetermined time after the start of the engine is not affected by the residual fuel quantity but is affected by the burned fuel quantity supplied from the fuel injection valve, namely, by the fuel property. Accordingly, in this aspect, it is clearly described that detection by the second detecting means is performed after a predetermined number of engine revolutions is reached after the occurrence of initial combustion of the engine.

According to an 18th aspect of the control apparatus of the present invention, the second detecting means is adapted to detect a burned fuel quantity or a fuel evaporation rate after the engine speed settles into a predetermined range and becomes stable.

More specifically, descriptions of the eighth and 17th aspects are applicable to the 18th aspect. Description of this aspect clearly shows that detection by the second detecting means is carried out after the engine speed settles into a predetermined range and becomes table.

According to a 19th aspect of the control apparatus of the present invention, the first detecting means detects a burned fuel quantity or a fuel evaporation rate on the basis of an integrated value of the engine speed and/or a maximum value of the engine speed in a period from when the engine speed is greater than or equal to a predetermined value C until the engine speed is greater than or equal to a predetermined value D.

More specifically, by detecting an engine speed, in other words, a combustion torque, a fuel evaporation rate (a burned fuel quantity or an air-fuel ratio in combustion) is obtained.

According to a 20th aspect of the control apparatus of the present invention, the second fuel evaporation rate detecting means is adapted to detect a burned fuel quantity or a fuel evaporation rate on the basis of change in the engine speed.

More specifically, by detecting a fuel-air ratio in combustion from a change in the engine speed, a fuel evaporation rate (a burned fuel quantity) is obtained.

According to a 21st aspect of the control apparatus of the present invention, the first or second detecting means is adapted to detect a burned fuel quantity or a fuel evaporation rate on the basis of a concentration of HC (hydrocarbon) or CO (carbon monoxide) as exhaust components of the engine.

More specifically, in this aspect, the control apparatus utilizes a HC concentration or a CO concentration is correlated with an air-fuel ratio in combustion. By detecting an air-fuel ratio in combustion, a fuel evaporation rate (a burned fuel quantity) can be obtained.

According to a 22nd aspect of the control apparatus of the present invention, the first or second detecting means is adapted to detect a burned fuel quantity or a fuel evaporation rate on the basis of an air-fuel ratio as an exhaust component of the engine.

More specifically, by detecting an air-fuel ratio in combustion, a fuel evaporation rate (a burned fuel quantity) is obtained.

According to a 23rd aspect of the control apparatus of the present invention, the second detecting means includes means for directly or indirectly detecting a response characteristic of from fuel injection into the engine up to an exhaust component, and therefore is adapted to detect a burned fuel quantity or a fuel evaporation rate on the basis of the response characteristic. (For the 23rd to 25th aspects, refer to FIG. 9.)

More specifically, a fuel evaporation rate is detected by using a phenomenon that the response characteristic of from fuel injection to an exhaust component changes according to the fuel property (fuel evaporation rate).

According to a 24th aspect of the control apparatus of the present invention, it is arranged that the response characteristic is detected in time domain, such as step response time.

More specifically, description of the 23rd is applicable to the 24th aspect. The fuel injection quantity is changed in a step manner, and according to a response time (63.4%, 90%, for example) obtained as a result, a fuel evaporation rate is detected. It is clearly described that though response time is detected by a process in time domain, some other response characteristic to be processed in time domain may be applied in principle.

According to a 25th aspect of the control apparatus of the present invention, it is arranged that the above-mentioned response characteristic may be a frequency response characteristic to be detected in time domain.

More specifically, description of the 23rd aspect is applicable to this aspect. By causing the fuel injection quantity to vibrate at a predetermined frequency or amplitude, and on the basis of an amplitude and a phase of an exhaust component obtained as a result, a fuel evaporation rate is detected. A predetermined frequency has only to be in a frequency band where a difference in the fuel property can be separated. In other words, in a frequency response characteristic of from fuel injection to exhaust component, such as an air-fuel ratio, a gain characteristic decreases at frequencies greater than or equal to a cutoff frequency and stays at about 1 at not more than the cutoff frequency. The cutoff frequency changes with different fuel properties. To be more concrete, the heavier the fuel property is (the lower the evaporation rate is), the more the cutoff frequency moves to the low frequency side. Therefore, by causing a fuel to vibrate in a frequency band near the cutoff frequency when a soft fuel is used, and by detecting a frequency response characteristic of the exhaust component at this time, it becomes possible to detect a property of the fuel. However, at too high a frequency, because the S/N ratio worsens until the response gain becomes small, it is necessary to optimize it.

Note that though amplitude characteristic and phase characteristic are processed in frequency domain, some other response characteristic to be processed in frequency domain may be applied in principle.

According to a 26th aspect of the control apparatus of the present invention, it is arranged that a fuel injection quantity at start of the engine is set on the basis of the residual fuel quantity.

As has been described, because the residual fuel is burned together with a fuel supplied from the fuel injection valve when the engine is started, the residual fuel works as a disturbance to start-up control, resulting in deterioration of the exhaust performance. By detecting the residual fuel by the above-mentioned aspect, and by setting a start-up fuel injection quantity with a detected residual fuel taken into account, it becomes possible to control the fuel air-fuel ratio to a desired fuel air-fuel ratio and improve the exhaust performance and the running performance at start-up.

According to a 27th aspect of the control apparatus of the present invention, the engine control apparatus comprises means for notifying the detected residual fuel quantity and/or the fuel property.

More specifically, according to each of the aspects described, a residual fuel quantity is separated out, and this residual fuel quantity and a fuel property are detected in each of the foregoing aspects, and means for notifying detection results to the passengers or outside people is provided.

According to a 28th aspect of the control apparatus of the present invention, means is provided to decide and notify that an abnormality has occurred in the fuel system when an elapsed time from a stoppage to a start of the engine is less than or equal to a predetermined value and the detected residual fuel quantity is greater than or equal to a predetermined value.

More specifically, despite the fact that the engine stoppage time is less than or equal to a predetermined value, if the residual fuel quantity is greater than or equal to a predetermined value, abnormality is notified because the oil-tightness of the fuel injection valve is likely to have deteriorated and there are worries about the quantity of HC evaporating to the outside (atmospheric air) of the engine while the engine is at rest.

According to a 29th aspect of the control apparatus of the present invention, means is provided to obtain a fuel property on the basis of a second fuel evaporation rate when a second fuel evaporation rate detected by the second detecting means is higher than a first fuel evaporation rate detected by the first detecting means and to decide that engine abnormality has occurred which will aggravate the fuel evaporation rate on the basis of a difference or a ratio between the first fuel evaporation rate and the second fuel evaporation rate.

More specifically, as has been described in the eighth aspect, since the residual fuel left in the engine before start-up is burned in a short time after the engine is started, detection results by the first detecting means obtained during a predetermined time after the start-up of the engine include both a burned fuel quantity supplied from the fuel injection valve and a burned quantity of fuel other than the fuel supplied from the fuel injection valve (a residual fuel quantity). On the other hand, detection results by the second detecting means obtained after passage of a predetermined time after the start-up of the engine are not affected by the residual fuel quantity but affected only by the burned fuel quantity supplied from the fuel injection valve, in other words, the fuel property.

Therefore, generally, the fuel evaporation rate obtained by the first detecting means is apparently higher by an amount corresponding to the residual fuel quantity than the fuel evaporation rate obtained by the second detecting means. However, if this relation is reversed, in other words, if the fuel evaporation rate obtained by the first detecting means is apparently lower than the fuel evaporation rate obtained by the second detecting means, a decision is made that engine abnormality has occurred, which will aggravate the fuel evaporation rate.

According to a 30th aspect of the control apparatus of the present invention, when engine abnormality has occurred, which will aggravate the fuel evaporation rate, the above-mentioned decision means is adapted to decide that the fuel intake efficiency is aggravated due to fuel deposits formed in the intake valve and take countermeasures.

Meanwhile, an automobile according to the present invention is equipped with the control apparatus described above.

According to the present invention, the fuel, remaining in the cylinder and the intake passage before the engine is started, and its fuel property are separated and detected; therefore, a parameter, such as a fuel injection quantity at the start of the engine, can be optimized, and as a result, the exhaust performance and the running performance at the start of the engine are balanced and optimized.

Other objects, features and advantages of the invention will become apparent from the following description of the embodiments of the invention taken in conjunction with the accompanying drawings.

DESCRIPTION OF THE EMBODIMENTS

Embodiments of the control apparatus of the engine according to the present invention are described with reference to the accompanying drawings.

Figure 1:
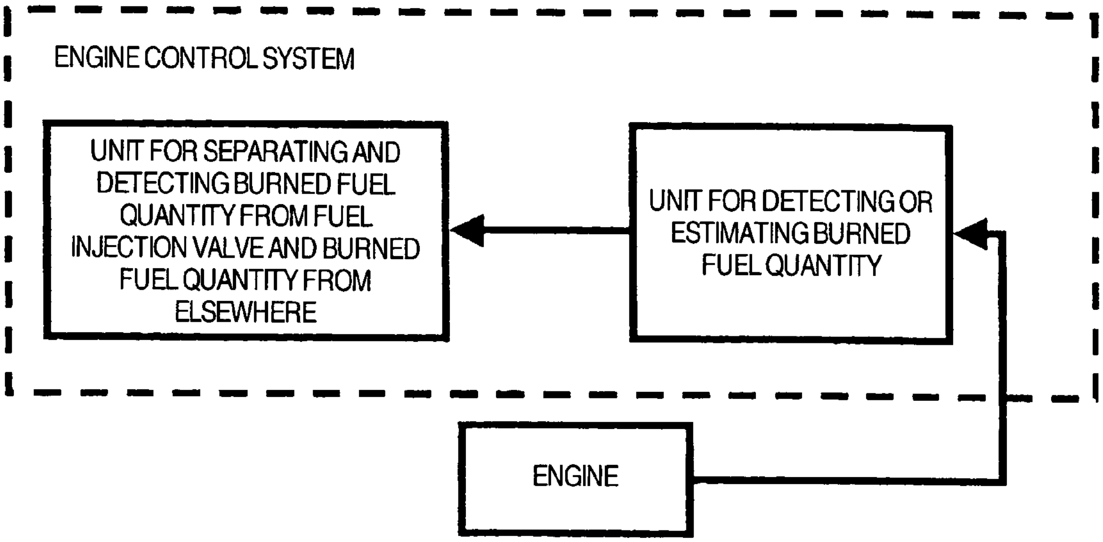
FIG. 1 is a diagram for explaining a first aspect of the control apparatus of the present invention.
Figure 2:
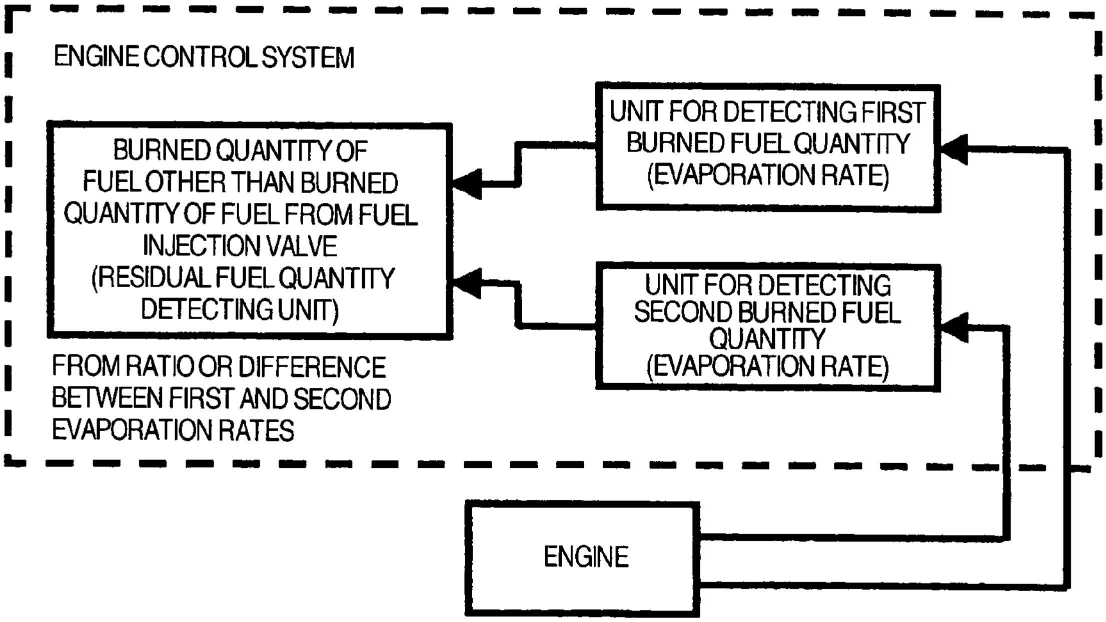
FIG. 2 is a diagram for explaining second to fourth aspects of the control apparatus of the present invention.
Figure 3:
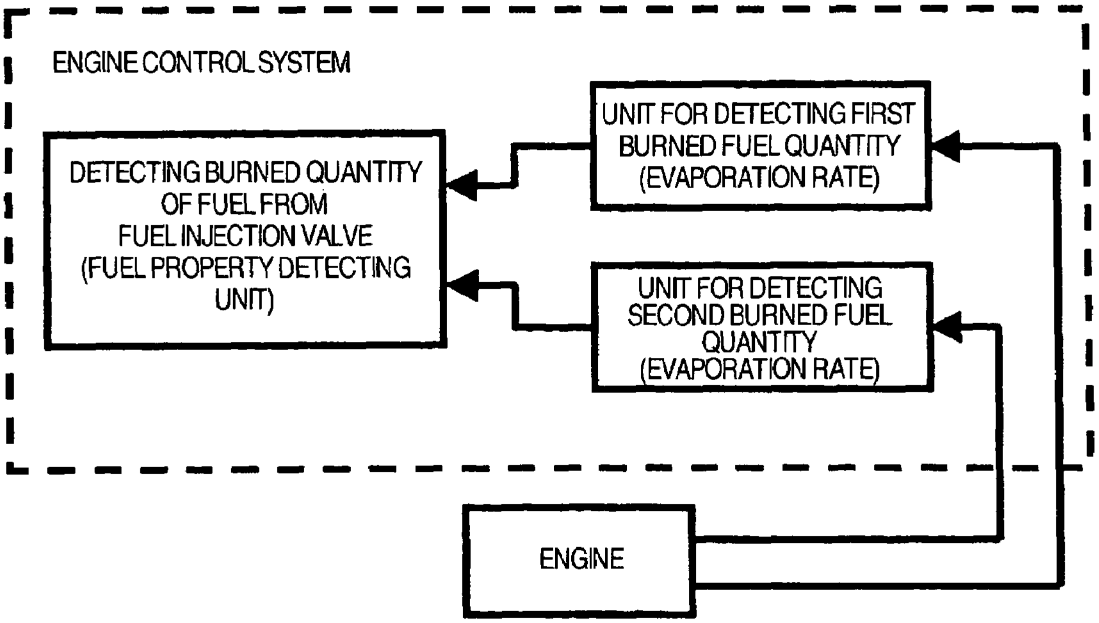
FIG. 3 is a diagram for explaining a fifth aspect of the control apparatus of the present invention.
Figure 4:
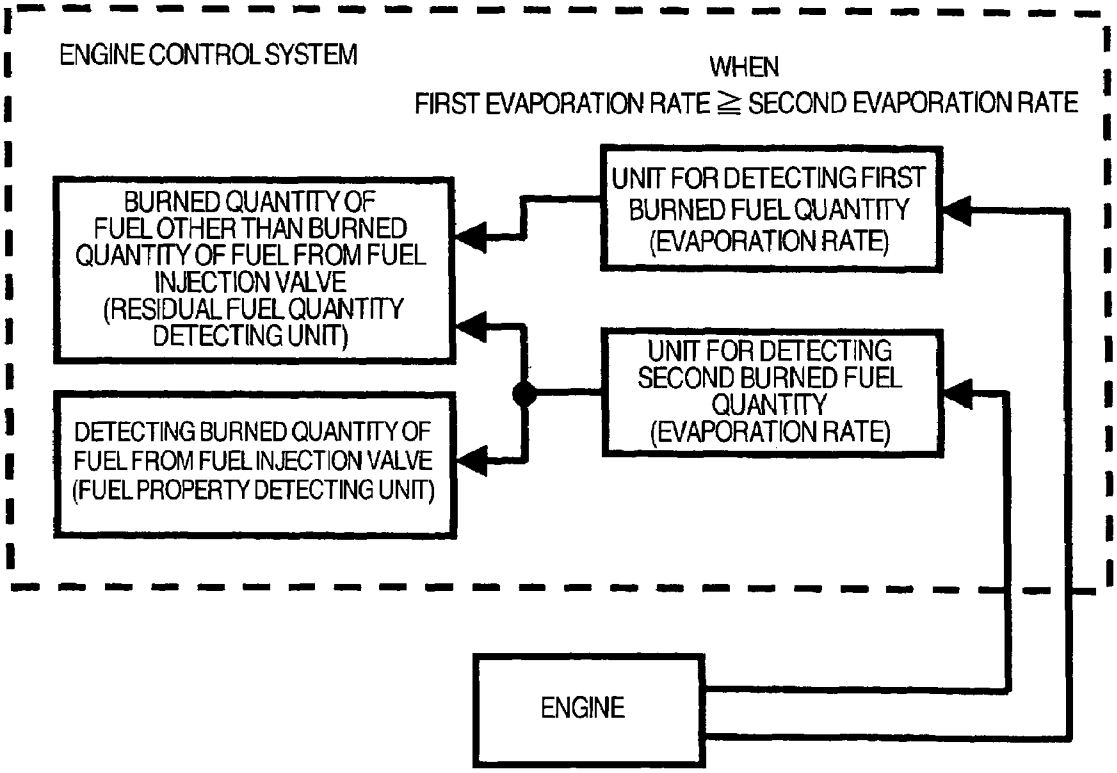
FIG. 4 is a diagram for explaining a sixth aspect of the present invention.
Figure 5:
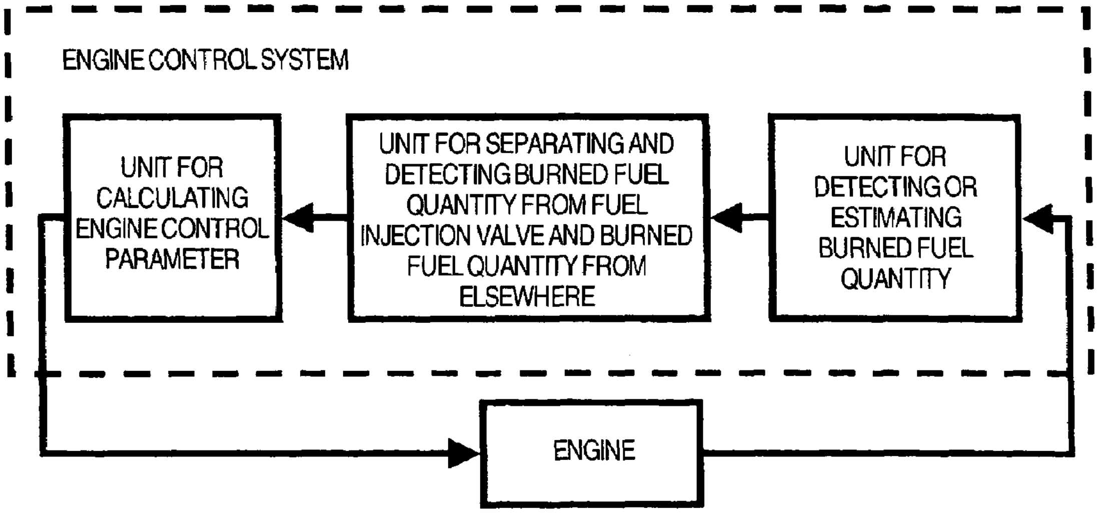
FIG. 5 is a diagram for explaining a seventh aspect of the control apparatus of the present invention.
Figure 6:
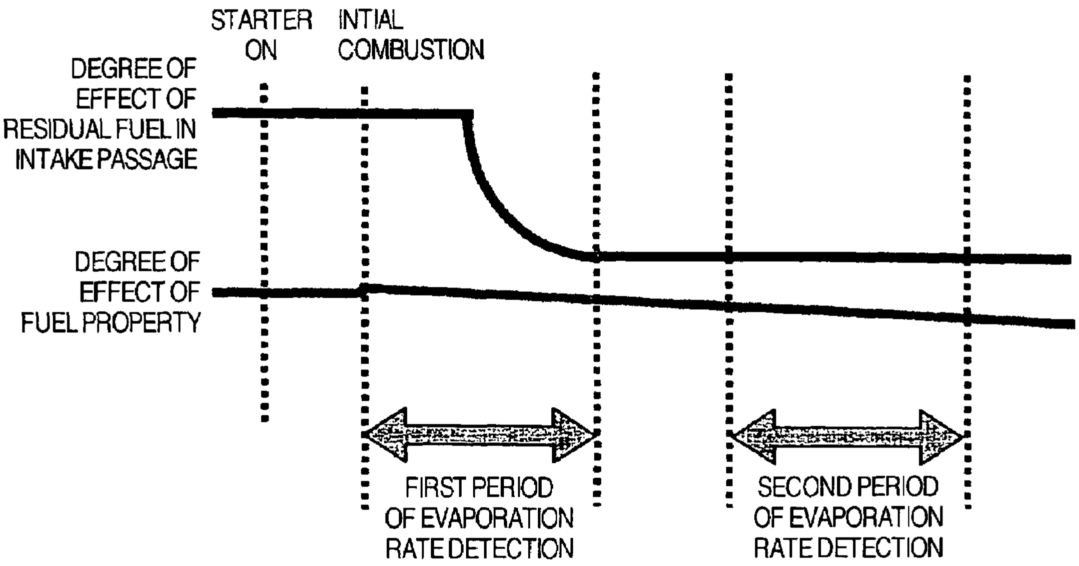
FIG. 6 is a diagram for explaining eighth to 22nd aspects of the control apparatus of the present invention.
Figure 7:
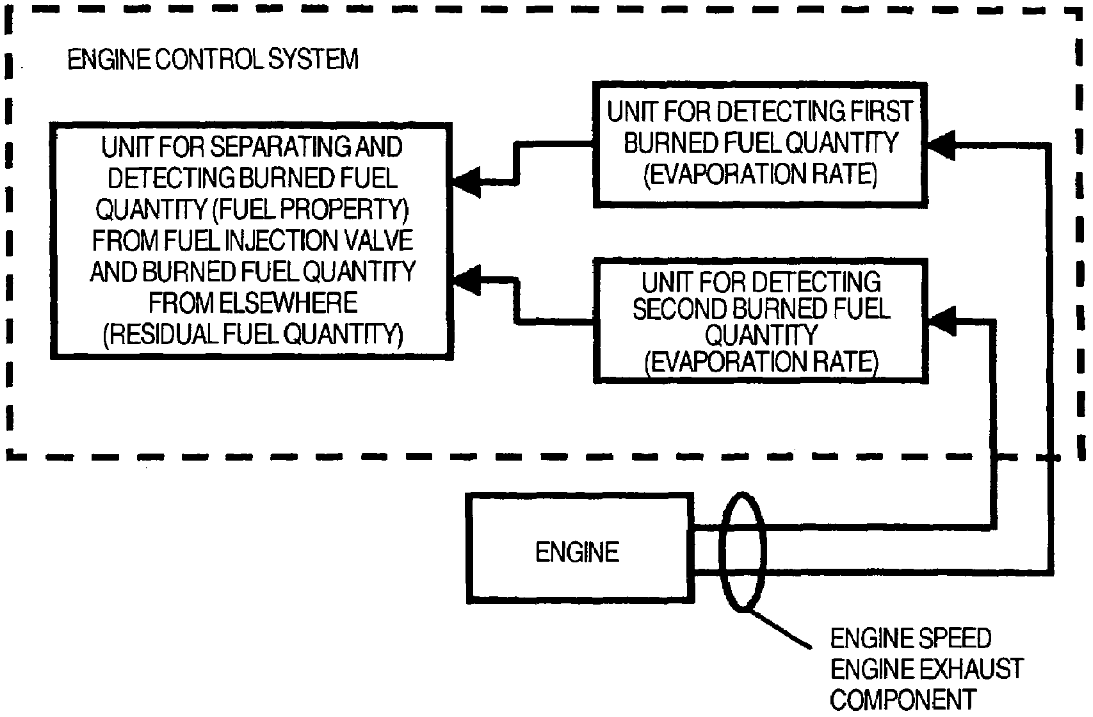
FIG. 7 is a diagram for explaining 12th to 13th aspects of the control apparatus of the present invention.
Figure 8:
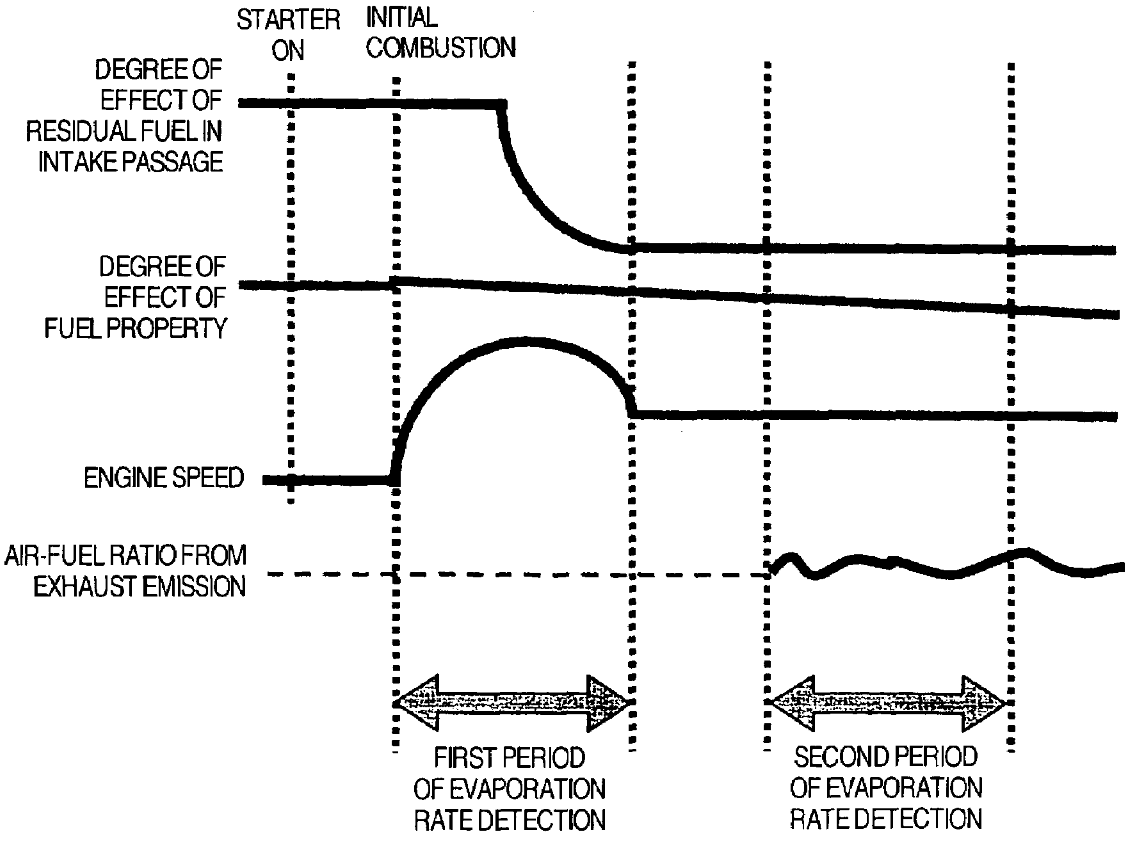
FIG. 8 is a diagram for explaining 14th to 22nd aspects of the control apparatus of the present invention.
Figure 9:
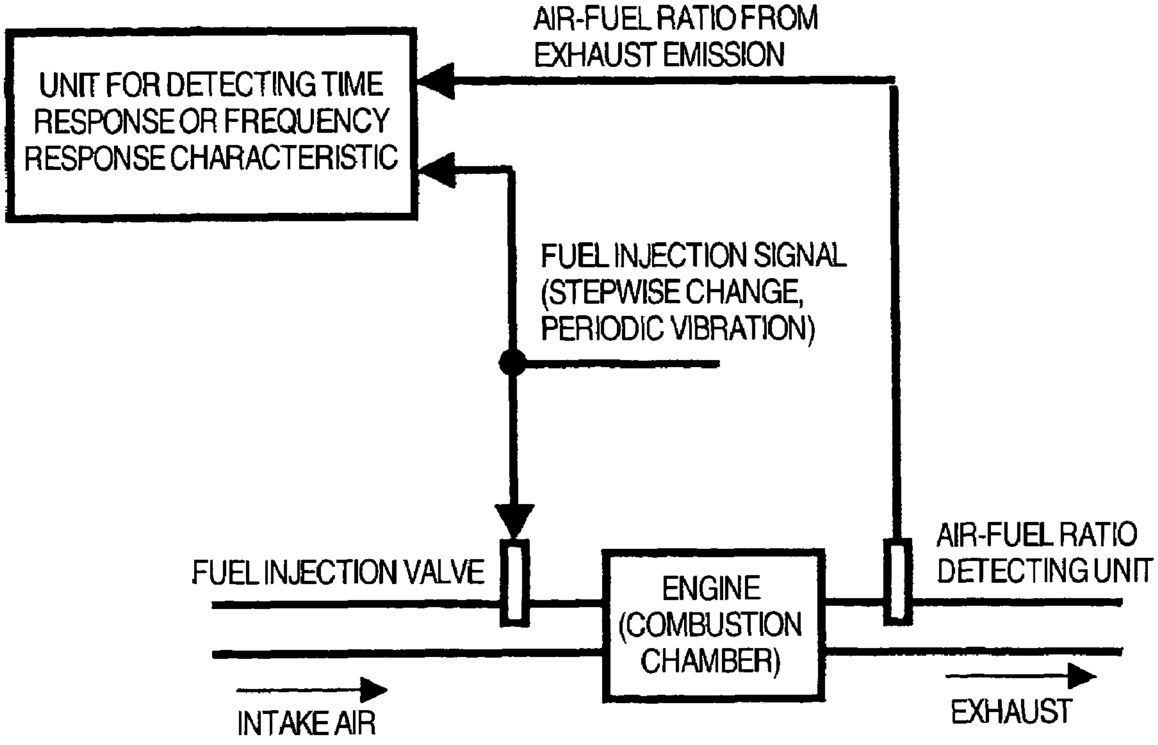
FIG. 9 is a diagram for explaining 23rd to 25th aspects of the control apparatus of the present invention.
Figure 10:
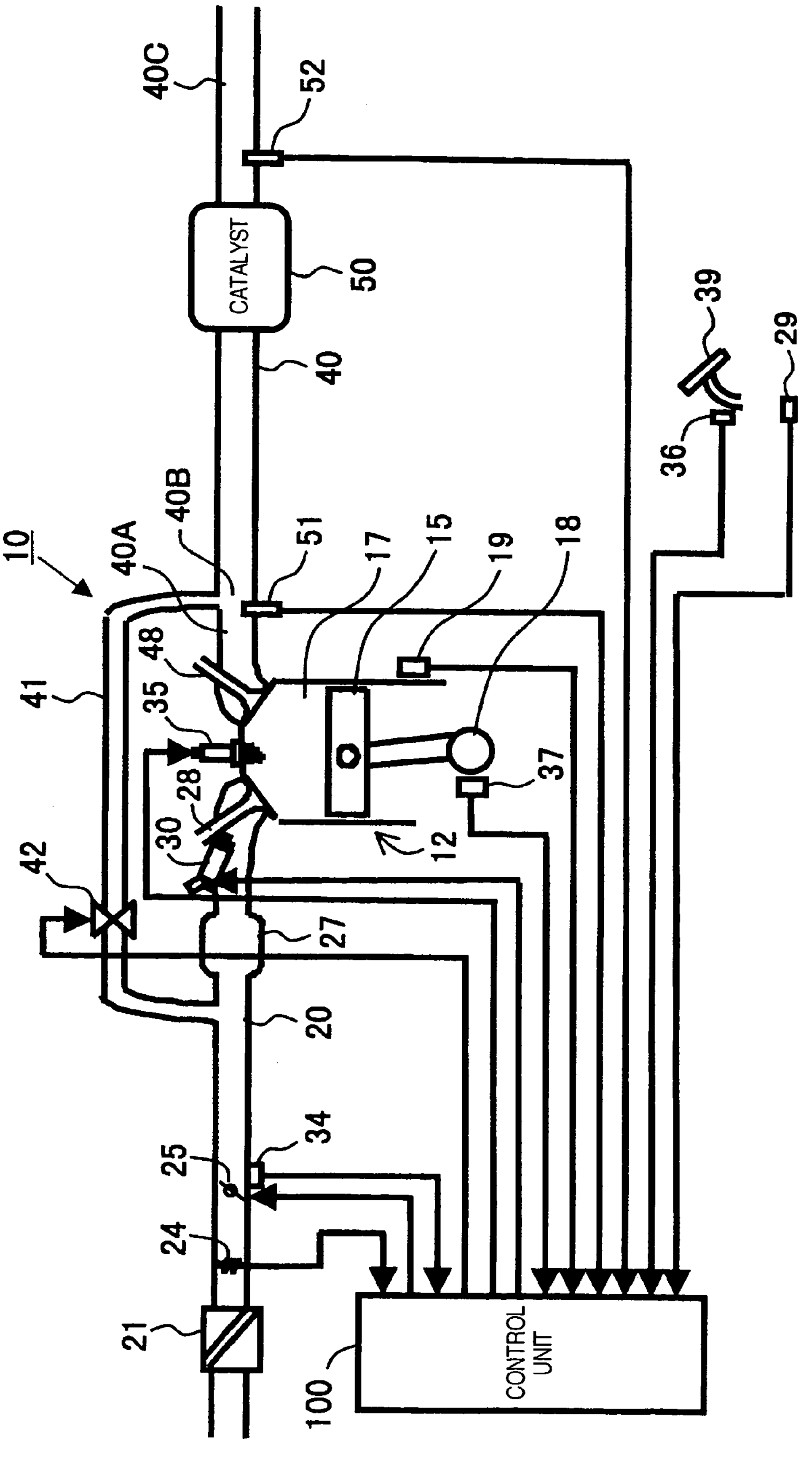
FIG. 10 is a diagram for explaining a schematic structure showing an engine to which embodiments of the control apparatus of the present invention are applied.

FIG. 10 is a schematic structure diagram showing an example of an automobile engine to which an embodiment (common to other embodiments) of the control apparatus of the present invention.

An engine shown in this figure is a multi-cylinder engine, such as one with four cylinders #1, #2, #3, and #4 (See FIG. 12), which includes a cylinder 12 having cylinders #1, #2, #3 and #4, and pistons 15 slidable in those cylinders. Above the pistons 15, there are combustion chambers 17, and ignition plugs 35 are provided for the combustion chambers of the cylinders #1, #2, #3, and #4.

The air for combustion of the fuel is from an air cleaner 21 provided at an end portion of the intake passage 20, passes through an air-flow sensor and an electrically controlled valve 25, and enters a collector 27, from which the air goes into a lift-timing control type magnetic-driven intake valve 28 mounted at the downstream end of the intake passage 20, and sucked into the combustion chambers 17 of the cylinders #1, #2, #3, and #4. A fuel injection valve 30 is provided at a downstream portion (intake port) of the intake passage 20.

A mixture of air sucked into the combustion chamber 17 and fuel supplied by the fuel injection valve 30 is burned by spark ignition by an ignition plug 35, a combustion waste gas (exhaust) is sent out from the combustion chamber 17, passes through the lift timing control type magnetic exhaust valve 48, and expelled to a separate passage 40A (FIG. 12) which forms an upstream portion of an exhaust passage 40. Then, the waste gas flows through the separate passage 40A and the exhaust collector 40 into a three-way catalyst 50 of the exhaust passage 40 and is cleaned and discharged to the outside.

An $O_2$ sensor 52 is provided on the downstream side from the three-way catalyst 50 on the exhaust passage 40, and an A/F sensor 51 is provided at the exhaust collector 40B on the upstream side from the catalyst 50 on the exhaust passage 40.

The A/F sensor 51 has a linear output characteristic with respect to the density of oxygen included in the exhaust gas. There is an almost linear relation between the oxygen density and the air-fuel ratio in the exhaust gas. Therefore, by the A/F sensor 51 which detects the oxygen density, it is possible to obtain an air-fuel ratio in the exhaust collector 40B. In the control unit 100, it is possible to calculate an air-fuel ratio on the upstream side of the three-way catalyst 50 from a signal from the A/F sensor 51, and also calculates from a signal from the $O_2$ sensor whether or not the $O_2$ density is rich or lean with respect to the $O_2$ density on the downstream side of the three-way catalyst 50 or stoichimetric (theoretical) combustion. By using those sensors 51 and 52, the control unit performs feedback (F/B) control by sequentially compensating the fuel injection quantity and the air quantity so that the purifying efficiency of the three-way catalyst 50 become optimum.

Part of the exhaust gas emitted from the combustion chamber 17 to the exhaust passage 40 is introduced into the intake passage through an EGR passage 41 as necessity requires, and re-circulated back to the combustion chamber of the cylinder 17 through a branch passage of the intake passage 20. An EGR valve 42 to adjust the EGR rate is inserted in the EGR passage.

The control apparatus 1 in this embodiment is provided with a control unit 100 which incorporates a microcomputer for various kinds of control of the engine.

Figure 11:
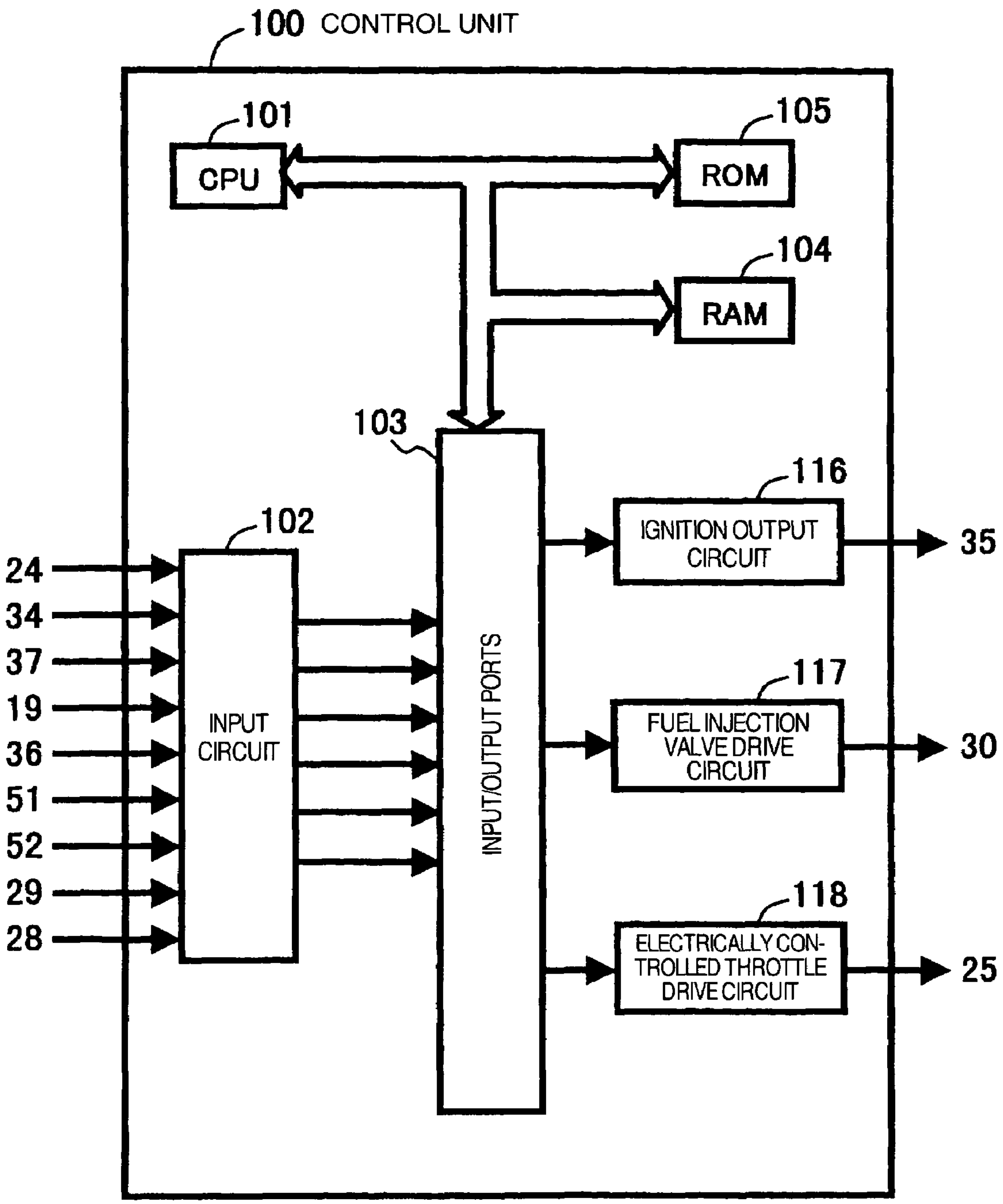
FIG. 11 is a diagram showing an internal structure of a control unit of a first embodiment of the present invention.

The control unit 100 is formed basically by a CPU 101, an input circuit 102, an input/output port 103, a RAM 104, and a ROM 105 as shown in FIG. 11.

Signals input to the control unit 100 are a signal corresponding to an intake air quantity detected by an air flow sensor 24, a signal corresponding to a valve travel of the throttle valve 25 detected by a throttle sensor 34, a signal representing the rotation (engine rotation number) and the phase of the crankshaft 18 sent from a crank angle sensor (rotation number sensor) 37 (The crank angle sensor 37 outputs a signal for every one degree of angle of rotation, for example), a signal from the $O_2$ sensor 52 provided on the downstream side from the three-way catalyst 50 in the exhaust passage 40 to express whether or not the $O_2$ density is rich or lean with respect to the $O_2$ density on the downstream side of the three-way catalyst 50 or stoichiometric (theoretical) combustion, a signal corresponding to an oxygen density (air-fuel ratio) detected by the A/F sensor 51 disposed at the exhaust collector 40B on the upstream side of the catalyst 50 in the exhaust passage 40, a signal corresponding to an engine cooling water temperature detected by a water temperature sensor 19 disposed at the cylinder 12, and a signal corresponding to a travel of the accelerator pedal 39 from an accelerator sensor 36 (which shows a required torque from the driver).

The control unit 100 receives outputs from the A/F sensor 51, the $O_2$ sensor 52, the throttle sensor 34, the air flow sensor 24, the crank angle sensor 37, the water temperature sensor 37, the water temperature sensor 19, and the accelerator sensor 36. According to the sensor outputs, the control unit 100 recognizes the operating conditions of the engine, and on the basis of the operating conditions, the control unit 100 calculates an intake air quantity, a fuel injection quantity, and main manipulated variables of the engine for ignition timing. A fuel injection quantity calculated in the control unit 100 is converted into a valve opening pulse signal, and sent through a fuel injection valve drive circuit 117 to the fuel injection valve 30. A drive signal is sent from an ignition output circuit 116 to the ignition plugs 35 so that ignition takes place at ignition timing calculated by the control unit 100.

More specifically, in the control unit 100, signals are processed to remove noise in the input circuit 102 and sent to the input/output port 103. Values at the input ports are stored in a RAM 104 and sent to undergo an arithmetic process in the CPU 101. A control program having contents of the arithmetic process described in it is previously written in a RAM 105. Values representing manipulated variables of the actuators calculated according to a control program are stored in the RAM 14 and sent to the output port 103.

For a drive signal to the ignition plug 35, an ON/OFF signal is used which is set to ON when the primary side coil of the ignition output circuit 116 is conducting and which is set to OFF when the primary side coil is non-conducting. The ignition timing is a time in point that the signal goes from the ON level to the OFF level. A signal for the ignition plug 35 set in the output port 103 is amplified in the ignition output circuit 116 to a sufficient energy required for ignition and sent to the ignition plug 35. For a drive signal for the fuel injection valve 30 (a valve opening pulse signal), an ON/OFF signal is used which is set to ON to open the valve and which is set to OFF to close the valve. This signal is amplified at the fuel injection valve drive circuit 117 to a sufficient energy to open the fuel injection valve 30 and supplied to the fuel injection valve 30. A drive signal to realize a target opening of the electrically-controlled throttle valve 25 is sent through an electrically-controlled throttle drive circuit 118 to the electrically-controlled throttle valve 15.

An input circuit and a drive circuit are provided for each of the lift timing control type magnetic-driven intake vale, and the lift timing control type magnetic exhaust valve, though they are not shown.

The contents of the processes executed by the control unit 100 are described in concrete terms in the following.

First Embodiment

Figure 12:
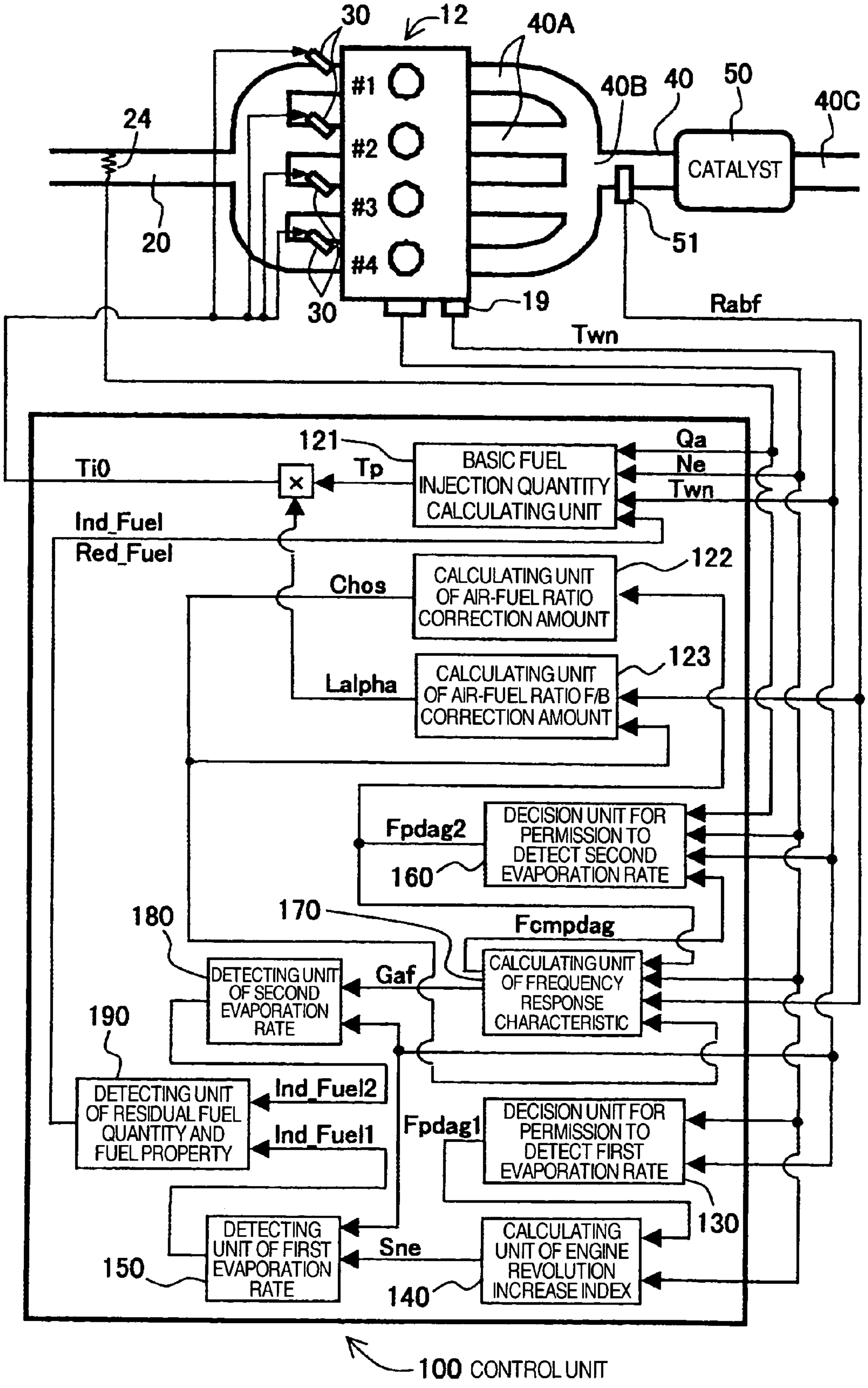
FIG. 12 is a diagram of the control system of first embodiment.

FIG. 12 is a diagram of the control system in a first embodiment. As shown in the functional block diagram, the control unit 100 includes a basic fuel injection quantity (Tp) calculating unit 121, an air-fuel ratio correction amount (Lalpha) calculating unit 122, an air-fuel ratio feedback (F/B) correction amount calculating unit 123, a first evaporation rate detection permission deciding unit 130, an engine speed increase index calculating unit 140, a first evaporation rate detecting unit 150, a second evaporation rate detection permission detecting unit 160, a frequency response characteristic calculating unit 170, a second evaporation rate detecting unit 180, and a residual fuel quantity and a fuel property detecting unit 190.

An individual cylinder fuel injection quantity Ti is calculated so that an air-fuel ratio in combustion of all cylinders is a theoretical air-fuel ratio by using the above-mentioned basic fuel injection quantity Tp and air-fuel ratio term Lalpha. The first evaporation rate is obtained from an integrated value of engine speed in a predetermined period after initial combustion at the start of the engine as described later. The first evaporation rate is affected by both a residual fuel and a fuel property as described above. On the other hand, the second evaporation rate is obtained from a response characteristic of an air-fuel ratio after passage of a predetermined time after the engine is started, in other words, in a period that a detection result is affected only by the fuel property without any effect from the residual fuel. It ought to be noted that when detecting a second evaporation rate, a target air-fuel rate is vibrated by a predetermined frequency and on the basis of a predetermined frequency component of an output signal from the A/F sensor 51, a fuel property is estimated. More specifically, the heavier the fuel property is, the smaller the predetermined frequency component (power spectrum) becomes. Each control block is described in detail as follows.

Each process means in the first embodiment is described in detail.

<Basic Fuel Injection Quantity Calculating Means 121 (FIG. 13)>

Figure 13:
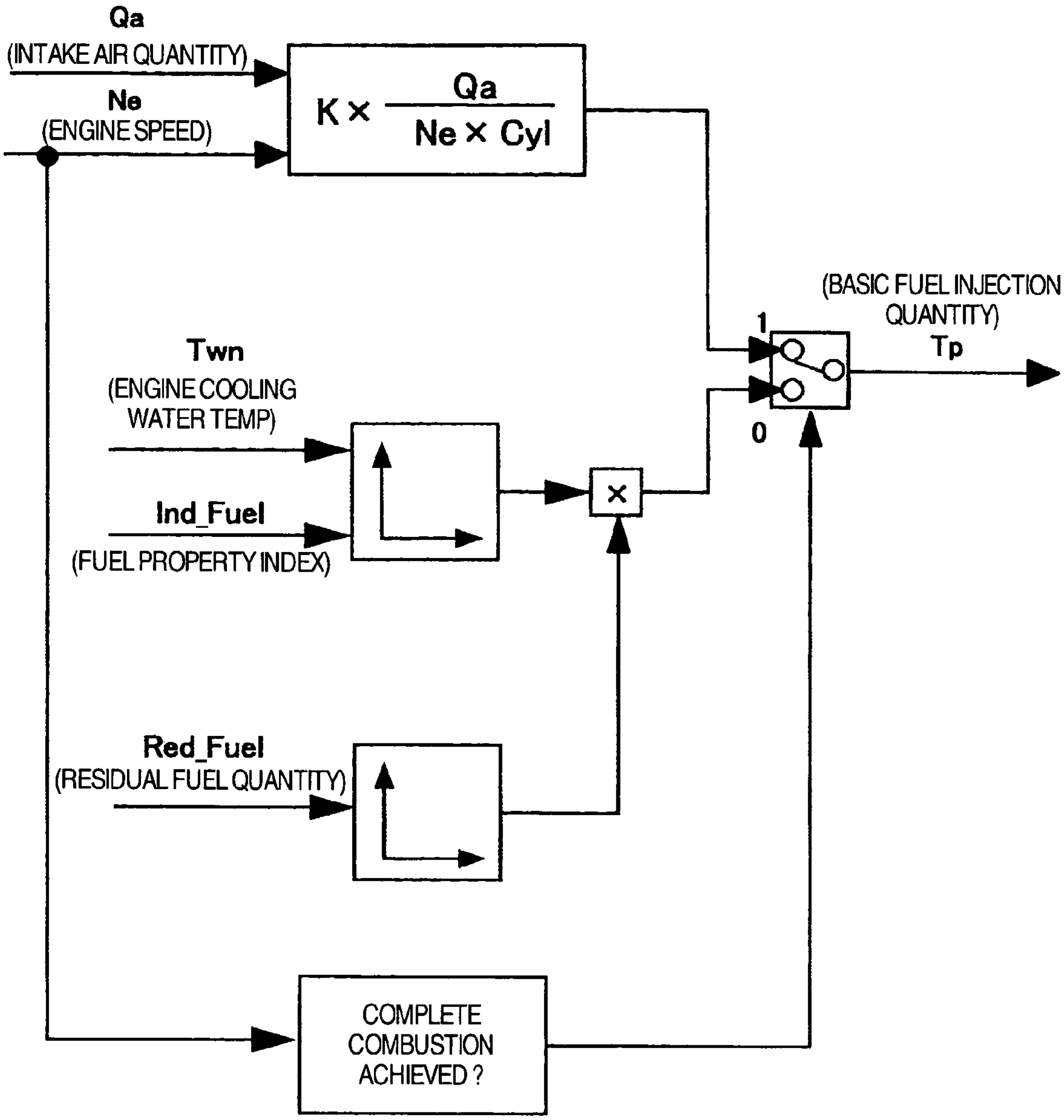
FIG. 13 is a diagram for explaining a basic fuel injection quantity calculating means in the first embodiment.

This calculating means 121 calculates a fuel injection quantity which simultaneously realizes a target torque and a target air-fuel ratio under optional running conditions on the basis of an intake air quantity detected by the air flow sensor 24. To be more concrete, as shown in FIG. 13, a basic fuel injection quantity Tp is calculated. A basic fuel injection quantity is calculated both when complete combustion has been achieved and when complete combustion has not been achieved. Complete combustion may be regarded as achieved when the engine revolution is greater than or equal to a predetermined value and if this continues for a predetermined period.

When complete combustion could not achieved, a basic injection quantity is calculated by an engine cooling water temperature (Twn) and a fuel property index (Ind_Fuel), and a basic injection quantity is adjusted on the basis of a residual fuel quantity (Red_Fuel). Incidentally, detailed calculation contents of a fuel property index (ind_Fuel) and a residual fuel quantity (Red_Fuel) will be described later.

K in a calculation formula of a basic fuel injection quantity Tp in complete combustion is a constant and is a value to be adjusted to always realize a theoretical air-fuel ratio for any inflow air quantity. Cyl denotes the number of cylinders of the engine (4 here).

<First Evaporation Rate Detection Permission Deciding Unit 130 (FIG. 14)>

Figure 14:
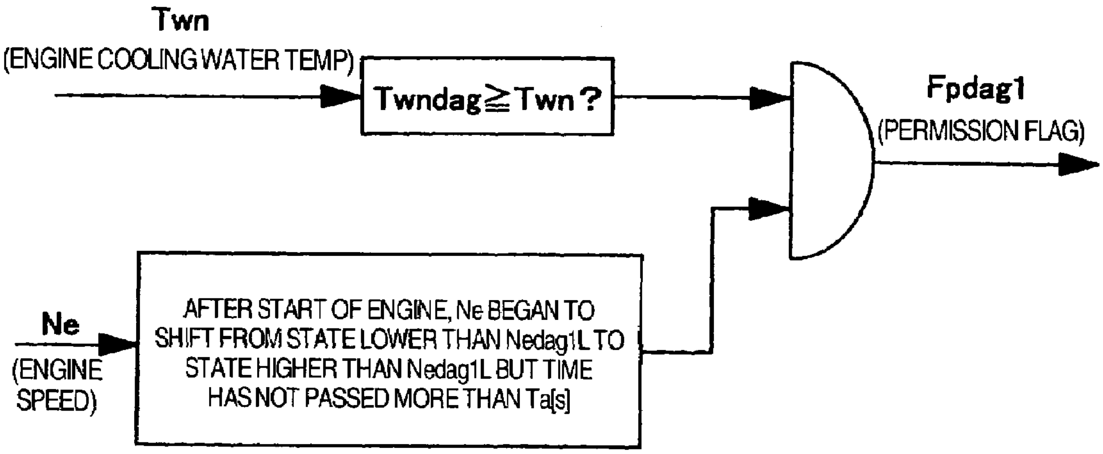
FIG. 14 is a diagram for explaining a deciding means of permission to detect a first evaporation rate in the first embodiment.

The unit 130 makes a decision as to whether to give a permission to detect a first evaporation rate. To be more specific, as shown in FIG. 14, if engine cooling water temperature (Twn)≦(Twndag) and "the engine was started and Ne has shifted from lower than Nedag1L to higher than Nedag1L but Ta[s] has not elapsed", the permission flag becomes Fpdag 1=1 to give a permission to detect a first evaporation rate. In a case where the conditions are not as described, detection is prohibited and the permission flag is set to Fpdag 1=0.

As described above, the first evaporation rate needs to be detected under a condition that a detection result is affected by both a residual fuel and a fuel property. In other words, because the residual fuel in the engine before the start of the engine is burned in a short time after the engine is started, preferably, Nedag1L is a value somewhat larger than an engine speed obtained by only torque of the starter motor and a value (200 rpm) less than or equal to an engine speed obtained by a so-called initial combustion. Similarly, Ta[s] is set to about 1 s to 2 s as a rule of thumb. Because Twndag needs to be in a temperature range where it is subject to effects of fuel property, and therefore needs to be at least 60° C. or lower, preferably 40° C. or lower.

<Engine Speed Increase Index Calculating Unit 140 (FIG. 15)>

Figure 15:
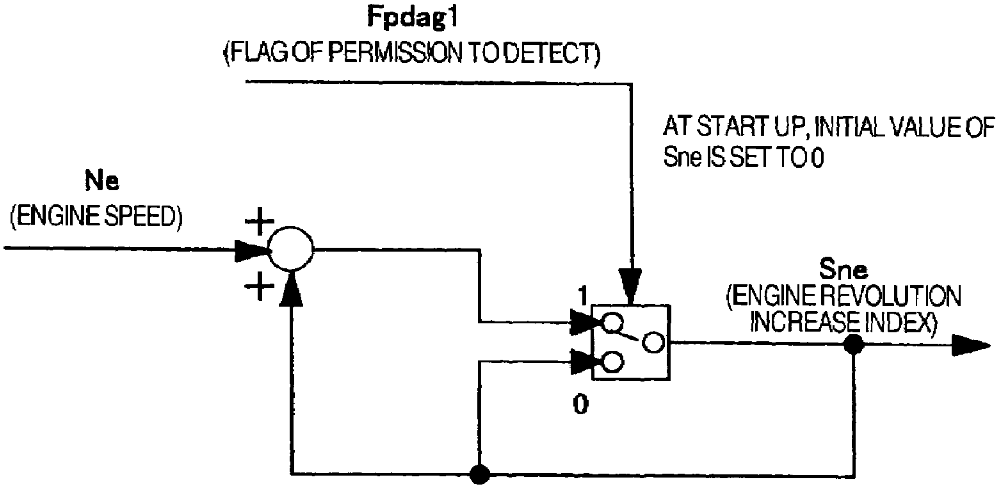
FIG. 15 is a diagram for explaining a calculating means of engine speed increase index in the first embodiment.

This calculating unit 140 calculates an engine speed increase index. In other words, as shown in FIG. 15, when a first evaporation rate detection permission flag (Fpdag1) is set to 1, a process of integrating the engine speed is performed. An integrated value of engine speed for a period of Fpdag=1 is used as an engine speed increase index Sne.

<First Evaporation Rate Detecting Unit 150 (FIG. 16)>

Figure 16:
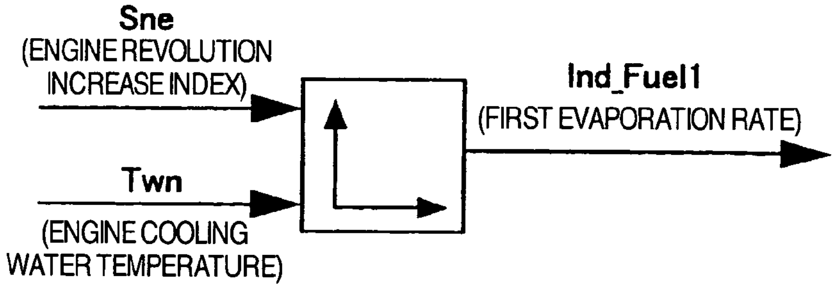
FIG. 16 is a diagram for explaining a detecting means of in a first evaporation rate in the first embodiment.

This detection unit 150 detects (calculates) a first evaporation rate. In other words, as shown in FIG. 16, the detection means 150 calculates a first evaporation rate (Ind_Fuel1) from an engine speed increase index (Sne) and an engine cooling water (Twn) by referring to a map. The values in the map, which show the relation between engine speed increase index (=generated torque) and first evaporation rate (air-fuel ratio in combustion), depend on engine specifications. They may be determined on an experimental basis.

<Second Evaporation Detection Permission Deciding Unit 160 (FIG. 17)>

Figure 17:
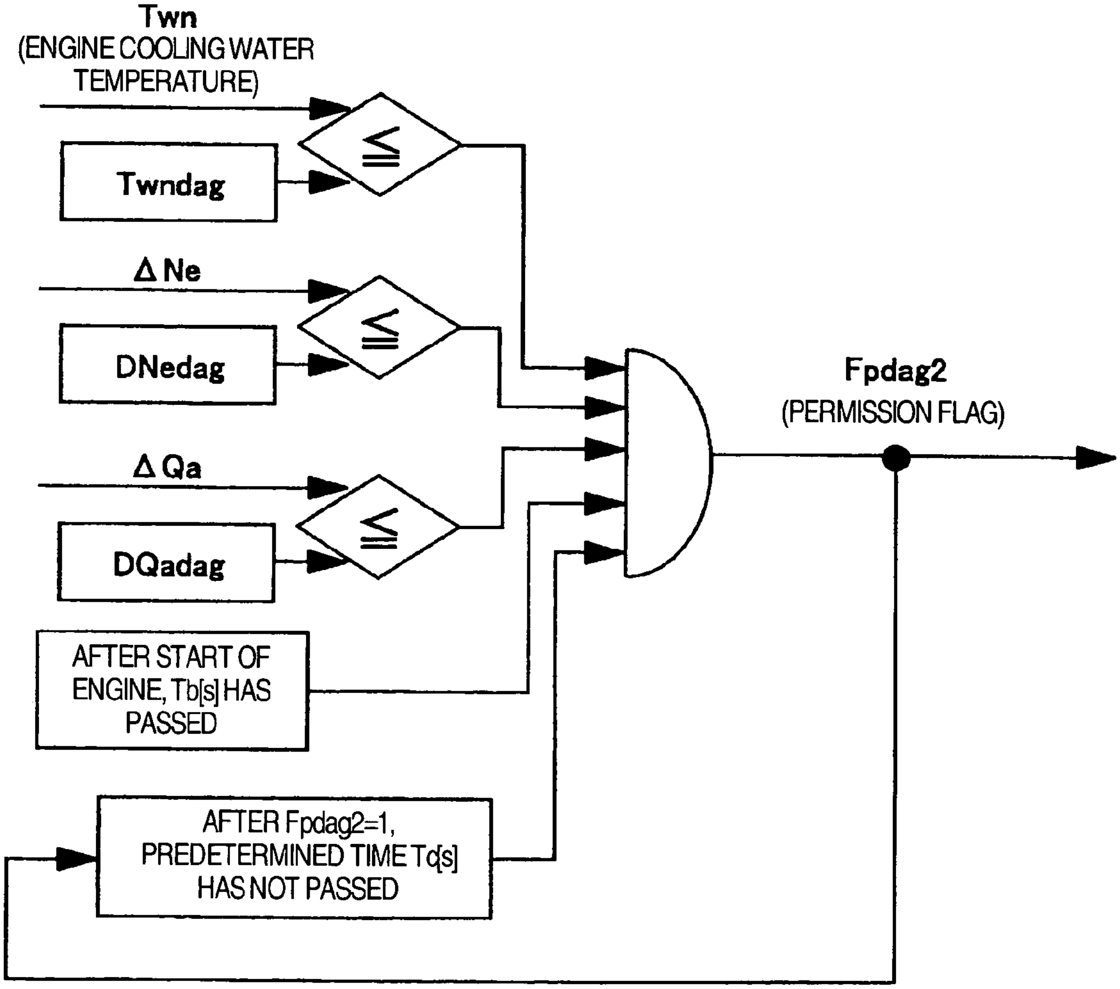
FIG. 17 is a diagram for explaining a deciding means of permission to detect a second evaporation rate in the first embodiment.

This unit 160 makes a decision whether to give a permission to detect a second evaporation rate. To be more specific, as shown in FIG. 17, if engine cooling water temperature Twn≦Twndag and ΔNe≦DNedag and ΔQa≦Dqadag and Tb[s] has passed after engine start and a predetermined time Tc[s] has not passed since Fpdag became 2=1, the permission flag is set to Fpdag 2=1 and a permission to detect a second evaporation rate is granted. In a case where the conditions are not as described, permission is inhibited and the flag is set to Fpdag 2=1.

As has been described, a second evaporation rate needs to be detected under a condition that it is affected only by fuel property. In other words, the residual fuel remaining in the cylinder before start-up is burned in a short period after the engine is started, the second fuel evaporation rate needs to be detected after a predetermined time elapses after the engine is started. For this reason, Tb[s] is set to about 5 s as a rule of thumb. Tc [s], which corresponds to a detection time, is preferably considered to be 2 s to 10 s on an experimental basis depending on the S/N ratio of output from the A/F sensor 51, which will be described later. Twndag, which needs to be in a temperature range where a detection result is affected by fuel property, must be at least less than or equal to 60° C., preferably 40° C. or less.

<Air-fuel Ration F/B Correction Amount Calculating Unit 123 (FIG. 18)>

Figure 18:
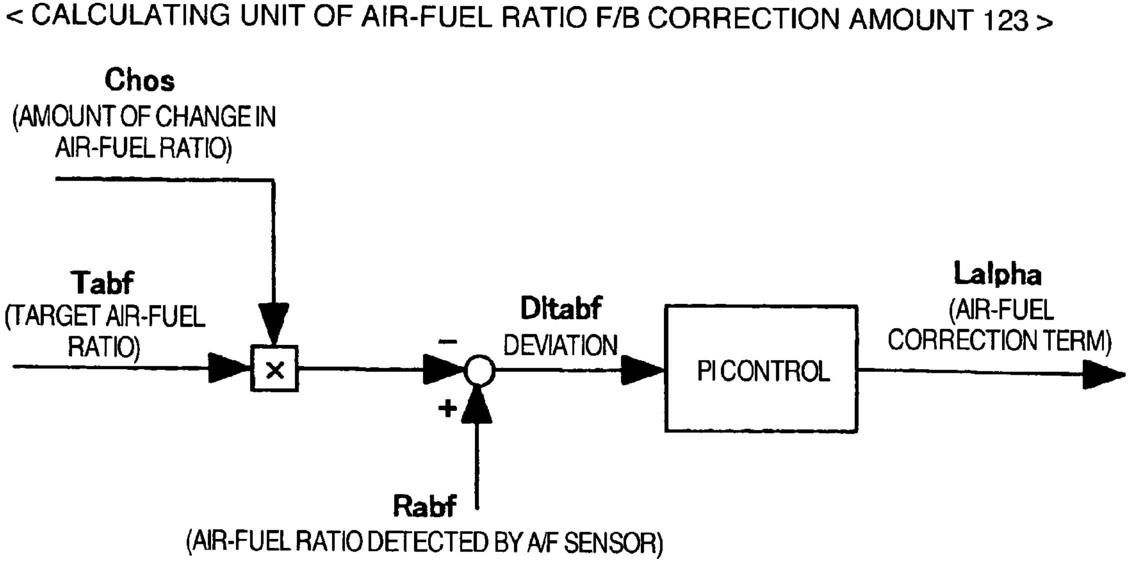
FIG. 18 is a diagram for explaining a calculating means of an air-fuel ratio feedback (F/B) correction amount in the first embodiment.

Here, on the basis of an air-fuel ratio detected by the A/F sensor 51, F/B (feedback) control is performed so that the air-fuel ratio becomes a target air-fuel ratio under an arbitrary running condition. More specifically, as shown in FIG. 18, an air-fuel ratio correction term Lalpha is calculated by PI control from a deviation Dltabf between a value, obtained by multiplying a target air-fuel ratio Tabf by an air-fuel correction term Chos, and an air-fuel ratio detected by the A/F sensor. The air-fuel ratio correction term Laslpha is multiplied by the basic fuel injection quantity Tp described above. Detail of the calculation of the air-fuel ratio change amount Chos, which will be described later, changes in a manner to cause the target air-fuel ratio to vibrate periodically when the second evaporation rate is detected.

Figure 19:
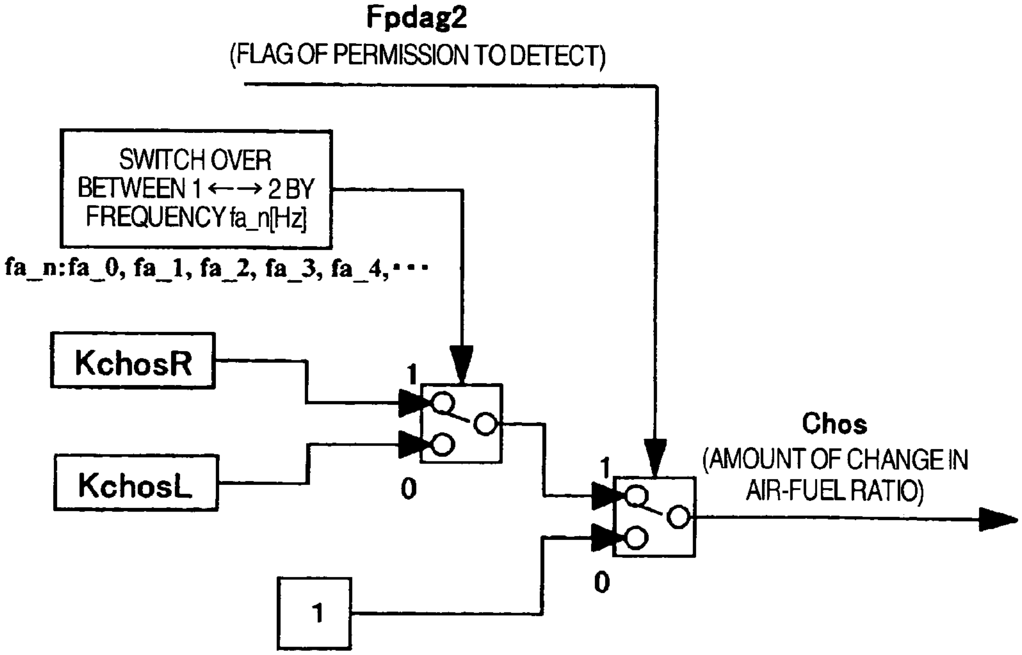
FIG. 19 is a diagram for explaining a calculating means of an air-fuel ratio correction in the first embodiment.

<Air-fuel Correction Amount Calculating Unit 122 (FIG. 19)>

This calculating unit 122 calculates an air-fuel ratio change amount Chos. More specifically, this calculation is carried out by a process shown in FIG. 19. To be more specific, when Fpdag 2=1, which is a time that permission to detect a second evaporation rate is granted, an air-fuel ration change amount Chos is obtained by switching between KchosR and KchosL by a frequency fa_n[Hz]. In other cases, the air-fuel ratio change amount is set to 1, which means without vibration. Though a number of frequencies are provided here for vibration frequency fa_n, the frequency may be 1 if it is in a frequency band where differences in fuel property can be separated. To be more specific, as has been described, in a frequency response characteristic of from fuel injection to exhaust component such as an air-fuel ratio, at frequencies higher than a cutoff frequency the gain characteristic is attenuated or at frequencies lower than the cutoff frequency the gain characteristic stays at almost 1. The cutoff frequency changes with different fuel properties. More specifically, the heavier the fuel property is (the evaporation rate is low), the more the cutoff frequency moves to the low frequency side. Therefore, by causing a fuel to vibrate in a frequency band close to a cutoff frequency for a light fuel and by detecting a frequency response characteristic of an exhaust component at that time, a fuel property can be detected. At too high a frequency, however, the S/N ratio worsens until the response gain becomes smaller, it is necessary to optimize it. With regard to amplitude, KchosR and KchosL should preferably be determined considering the running performance and the exhaust performance.

<Frequency Response Characteristic Calculating Unit 170 (FIG. 20)>

Figure 20:
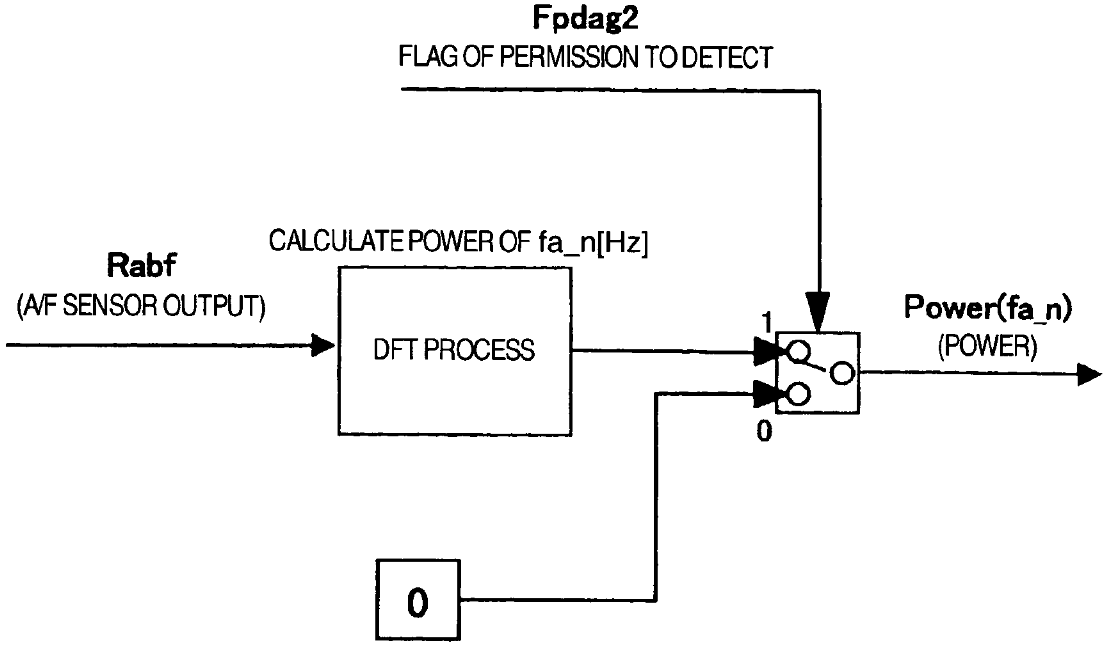
FIG. 20 is a diagram for explaining a calculating means of a frequency response characteristic in the first embodiment.

This calculating unit 170 analyses frequencies of output signal from the A/F sensor 51 when permission to detect a second evaporation rate is granted. To be more specific, as shown in FIG. 20, at Fpdag 2=1, which is a time when permission to detect a second evaporation rate is granted, power spectrum (=gain characteristic) Power (fa_n) of frequency fa_n is calculated by supplying an output signal of the A/F sensor 51 to a DFT (Discrete Fourier Transform) processor. Here, to calculate a spectrum only at a specific frequency, DFT was used but not FFT (Fast Fourier Transform). As for detail of the DFT process, there are many documents and books available and this process is not described here.

<Second Evaporation Rate Detecting Unit 180 (FIG. 21)>

Figure 21:
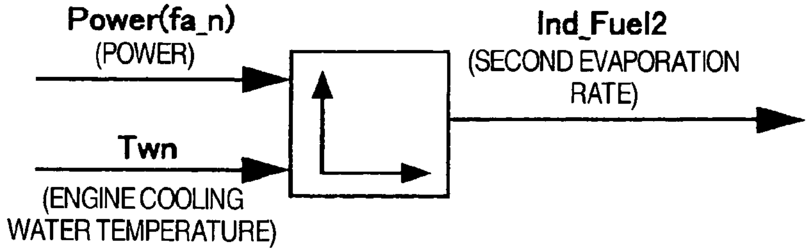
FIG. 21 is a diagram for explaining a detecting means of a second evaporation rate in the first embodiment.

This unit 180 detects (calculates) a second evaporation rate. To be more specific, as shown in FIG. 21, a second evaporation rate (Ind_Fuel2) is calculated from Power (fa_n) and an engine cooling water temperature (Twn) by referring to a map. The values of the map, which represent the relation between power (=air-fuel ratio response characteristic) and second evaporation rate, depend on engine specifications, such as the shape of exhaust passages and the location of the A/F sensor, and they may be determined on an experimental basis.

<Residual Fuel Quantity and Fuel Property Detecting Unit 190 (FIG. 22)>

Figure 22:
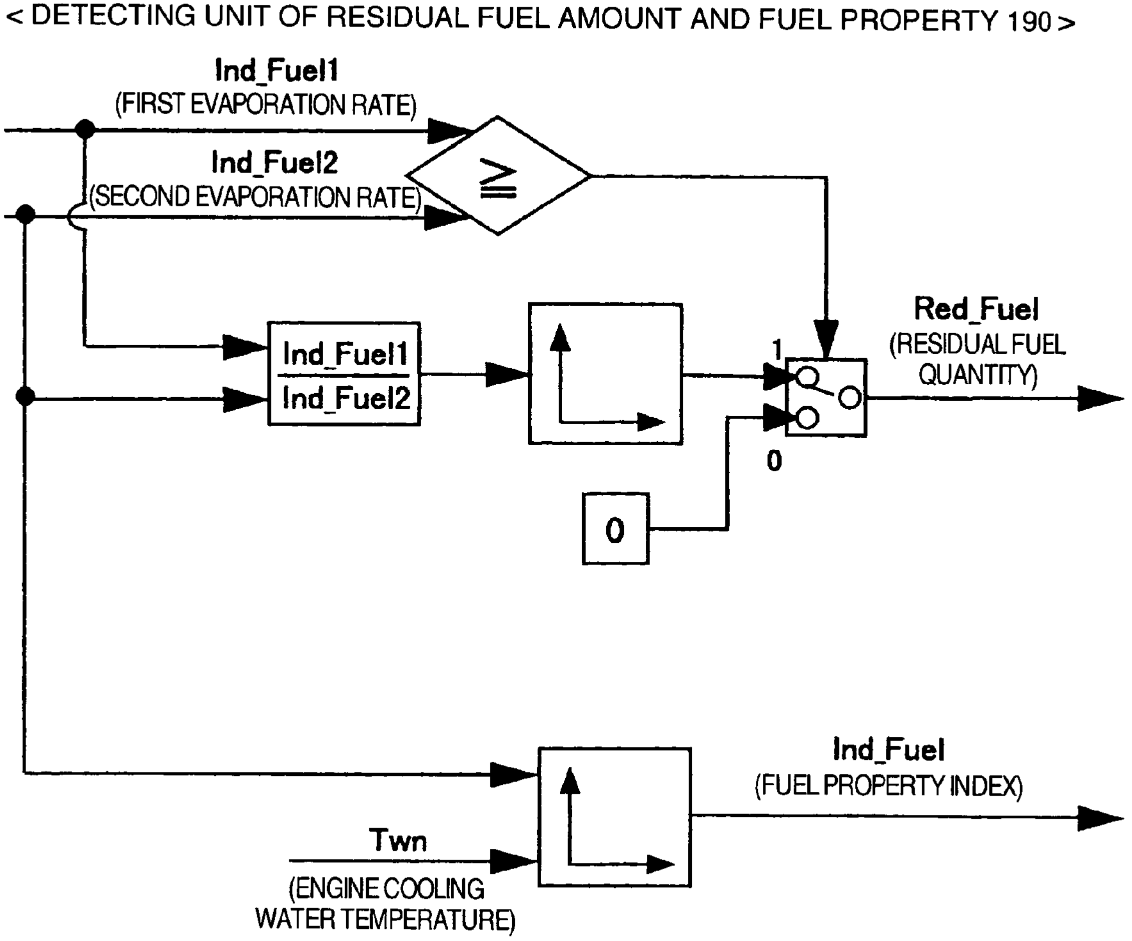
FIG. 22 is a diagram for explaining a detecting means of a residual fuel quantity and a fuel property in the first embodiment.

This unit 190 detects (calculates) a residual fuel quantity and a fuel property. In other words, as shown in FIG. 22, when a first evaporation rate is greater than a second evaporation rate, a residual fuel quantity Red_Fuel is obtained from a ratio of Ind_Fuel1 and Ind_Fuel2 by referring to a map. A fuel property index Ind_Fuel is obtained from Ind_Fuel2 and Twn by referring to the map.

More specifically, because the residual fuel remaining in the engine before start of the engine is burned in a short time after the engine is started, a detection result Ind_Fuel1 by the first fuel evaporation rate detecting means 150, which is obtained in a predetermined time after the start of the engine, includes both a burned fuel quantity supplied from the fuel injection valve 30 and a burned fuel quantity (residual fuel quantity) other than the fuel supplied from the fuel injection valve 30. On the other hand, a detection result Ind_Fuel2 by the second fuel evaporation rate detecting means 180, which is obtained after the engine is started and a predetermined time elapses, is not affected by the residual fuel quantity but affected only by the burned fuel quantity supplied from the fuel injection valve 30, namely, the fuel property. In the manner as described, combustion fuel quantities are detected in different periods where degrees of effects differ with different effect factors, and by comparing detection results, the effects of the residual fuel are separated from effects of the fuel property. Because the first evaporation rate Ind_Fuel1 is greater (higher) than the second evaporation rate Ind_Fuel2 by an amount corresponding to the quantity of the residual fuel. Therefore, only when this condition is established, a decision is made that the residual fuel quantity exists, and the residual fuel quantity Red_Fuel is obtained. Note that a map used to obtain Red_Fuel and Ind_Fuel may be formed on an experimental basis.

Second Embodiment

In the first embodiment, an engine speed (revolution number) increase index at engine start-up was used when the first evaporation rate was detected. In contrast, in a second embodiment, an air-fuel ratio is used when a first evaporation rate is detected. More specifically, a burned fuel quantity is detected from a difference or a ratio between the air-fuel ratio in fuel supply to the engine and the air-fuel ratio detected on the emission side.

Figure 23:
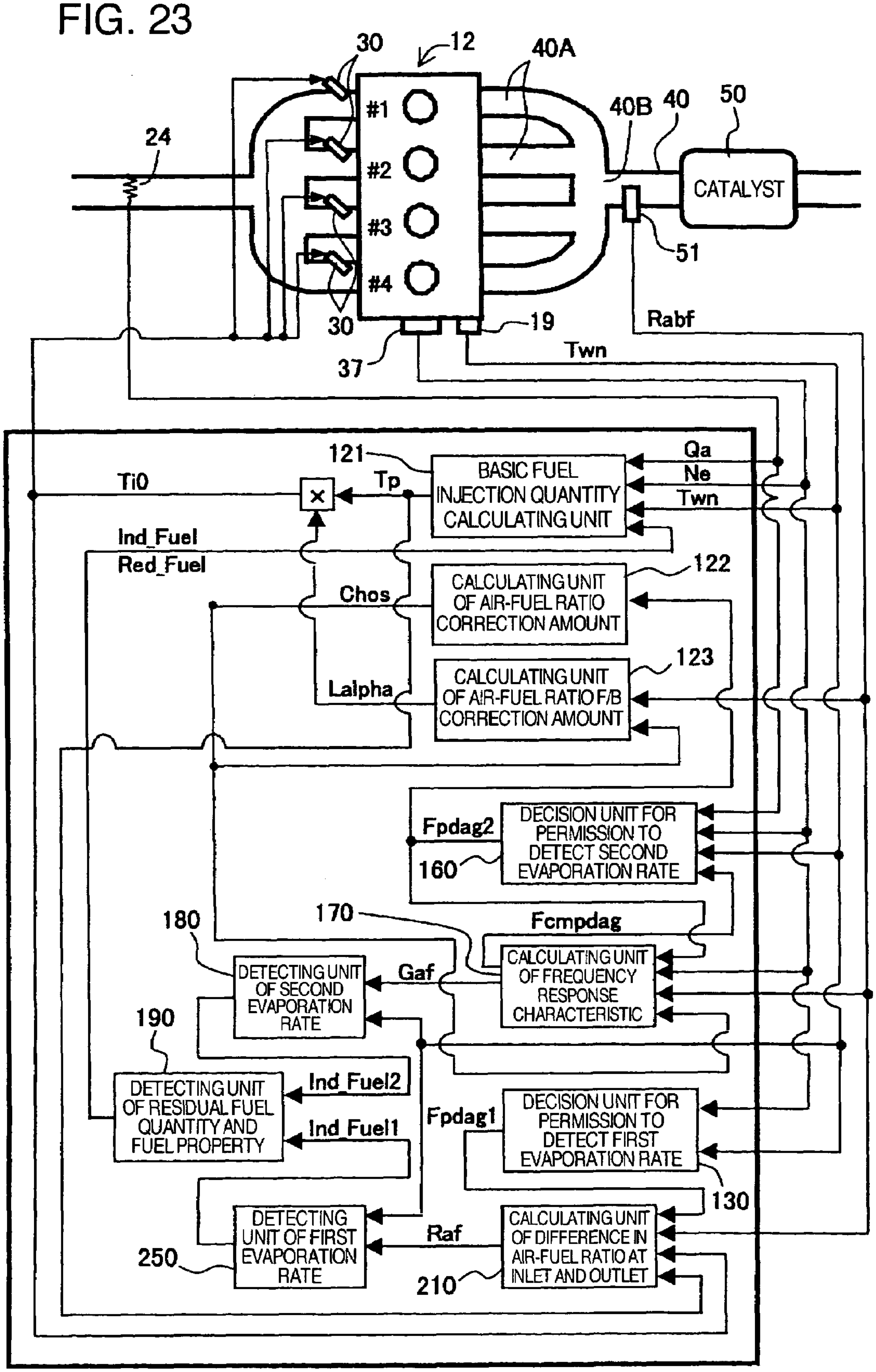
FIG. 23 is a diagram of a control system according to a second embodiment of the present invention.

FIG. 23 is a diagram of a control system in the second embodiment, and for detecting a first evaporation rate, an air-fuel ratio is used as described; therefore, a calculating unit of a difference in air-fuel ratio at inlet and outlet 210 is provided in place of the engine speed increase index calculating unit in the first embodiment.

Main unit of the second embodiment (except for those of the same functions as in the first embodiment) are described in detail.

<Air-fuel Ratio Difference Calculating Unit 210 at Inlet and Outlet (FIG. 24)>

Figure 24:
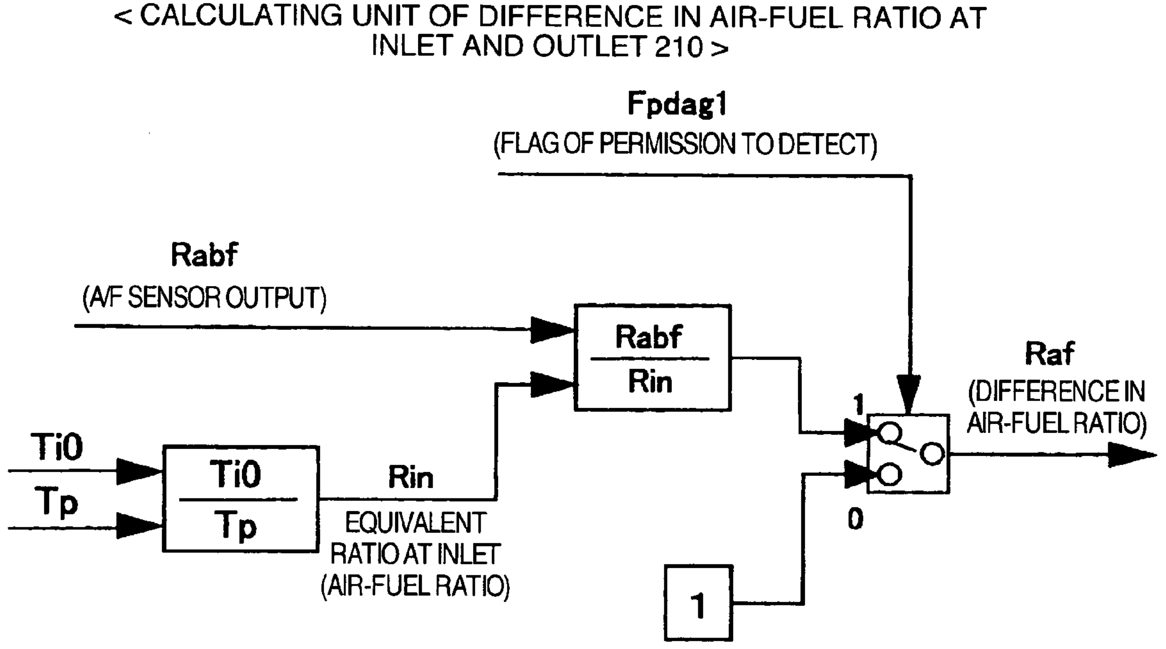
FIG. 24 is a diagram for explaining a calculating means of a difference between air-fuel ratios at the inlet and the outlet in the second embodiment.

This calculating unit 210 calculates a difference in an air-fuel ratio at inlet and outlet. More specifically, as shown in FIG. 24, when the first evaporation rate detection permission flag (Fpdag1) is set to 1, an inlet air-fuel ratio Rin is obtained from a ratio between a final fuel injection quantity and a basic fuel injection quantity Tp, and a difference (in fact, a ratio) Raf in air-fuel ratio between inlet and outlet is obtained from the inlet air-fuel ratio Rin and the exhaust air-fuel ratio Rabf.

<First Evaporation Rate Detecting Unit 250 (FIG. 25)>

Figure 25:
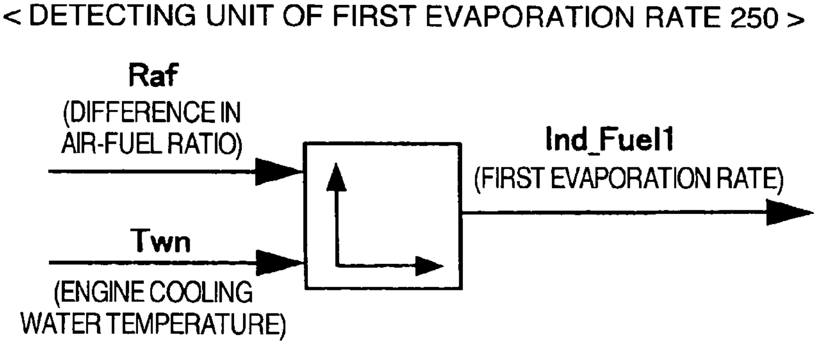
FIG. 25 is a diagram for explaining a detecting means of a first evaporation rate in the second embodiment.

This unit 250 detects (calculates) a first evaporation rate. More specifically, as shown in FIG. 25, a first evaporation rate (Ind_Fuel1) is calculated from an inlet/outlet air-fuel ratio difference (Raf) and an engine cooling water temperature (Twn) by referring to a map. The values of the map, which represent the relation between an inlet/outlet air-fuel ratio difference (Raf) and a first evaporation rate (air-fuel ratio), depend on engine specifications and may be determined on an experimental basis.

Third Embodiment

In a third embodiment, there is provided means for notifying abnormality on the basis of the quantity of residual quantity. In other words, despite the fact that the conditions when the engine is at rest, such as engine stoppage time, are within predetermined ranges, if the residual fuel quantity is greater than or equal to a predetermined value, abnormality is annunciated because the oil-tightness of the fuel injection valve is likely to have deteriorated and there are worries about the quantity of HC evaporating to the outside (atmospheric air) of the engine while the engine is at rest, for example.

Figure 26:
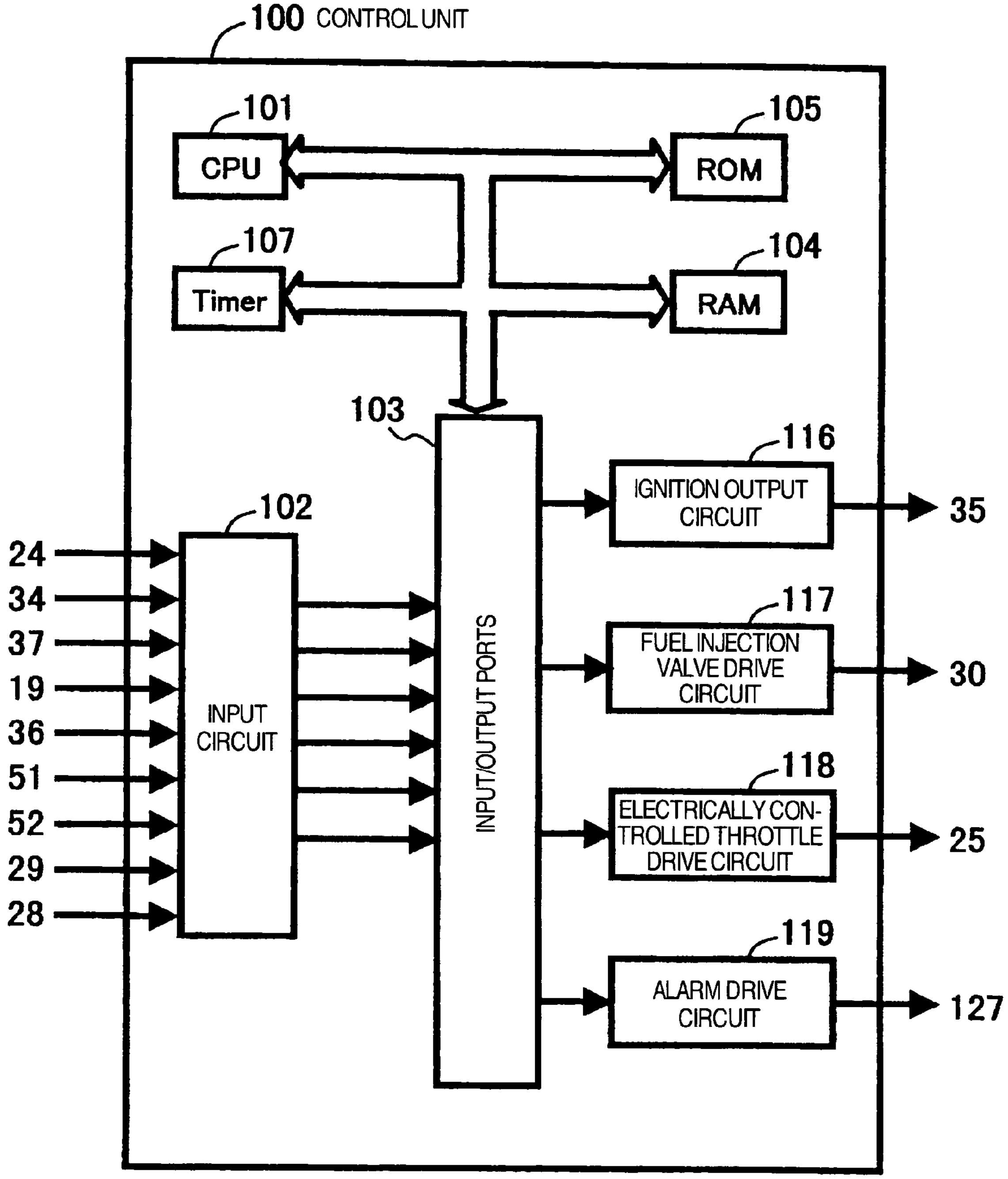
FIG. 26 is a diagram of an internal structure of the control unit in a third embodiment of the present invention.

In this embodiment, as shown in the internal structure of the control unit 100 in FIG. 26, a timer 107 capable of measuring time even during engine stoppage is added to the control unit 100 in the first and second embodiments.

To notify abnormality, an alarm drive circuit 119 and an alarm lamp 27 as an annunciating means, for example, are provided.

Figure 27:
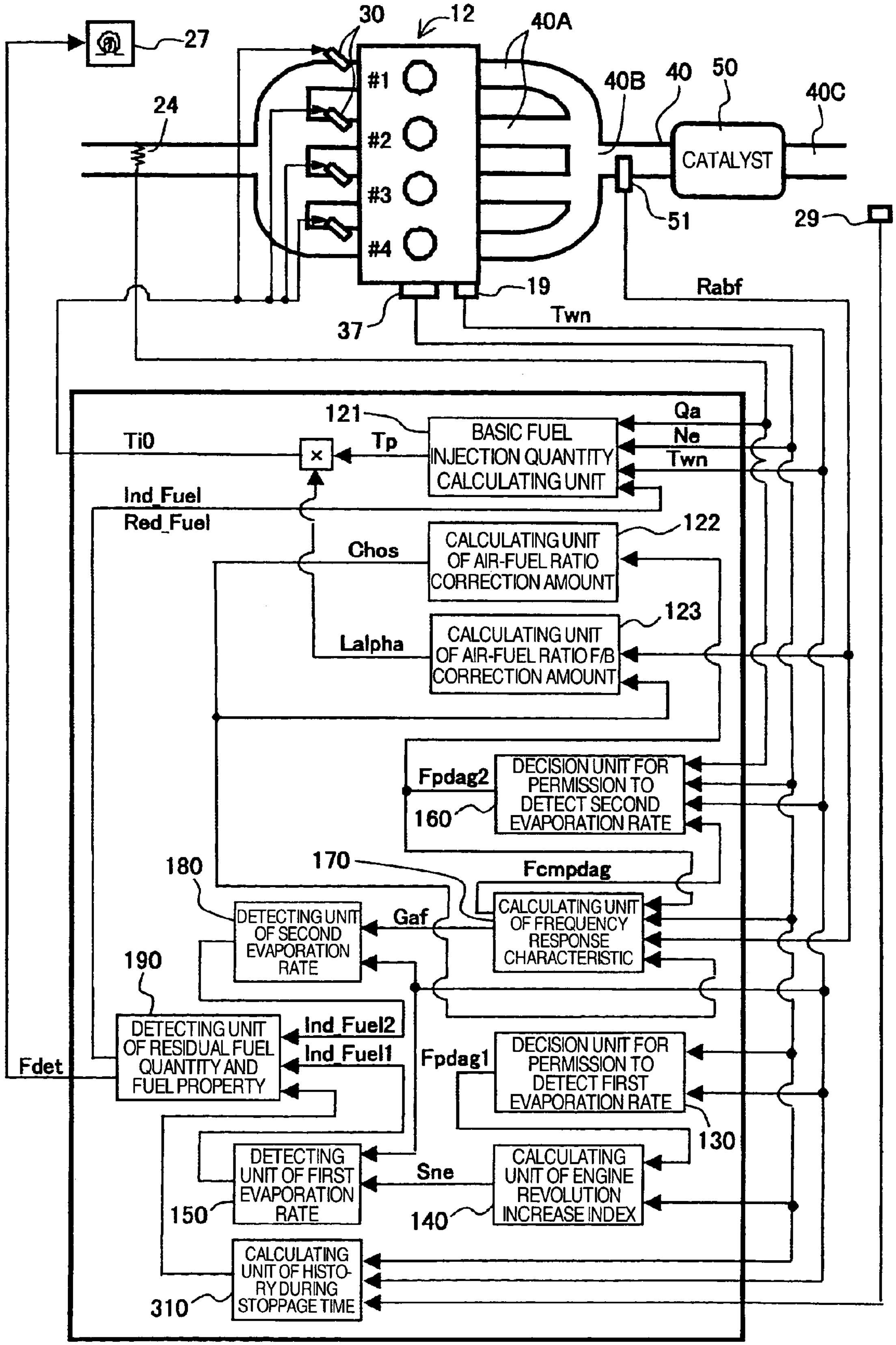
FIG. 27 is a diagram of a control system in the third embodiment.

FIG. 27 is a diagram of a control system in the third embodiment, and as described above, a calculating means pf history during stoppage time 310 and an alarm lamp 127 for notification to the outside which occurs based on the residual fuel quantity are added to the first embodiment.

Main portion (except for those of the same functions as in the first embodiment) in the third embodiment are described below.

<Calculating Unit of History During Stoppage Time 310 (FIG. 28)>

Figure 28:
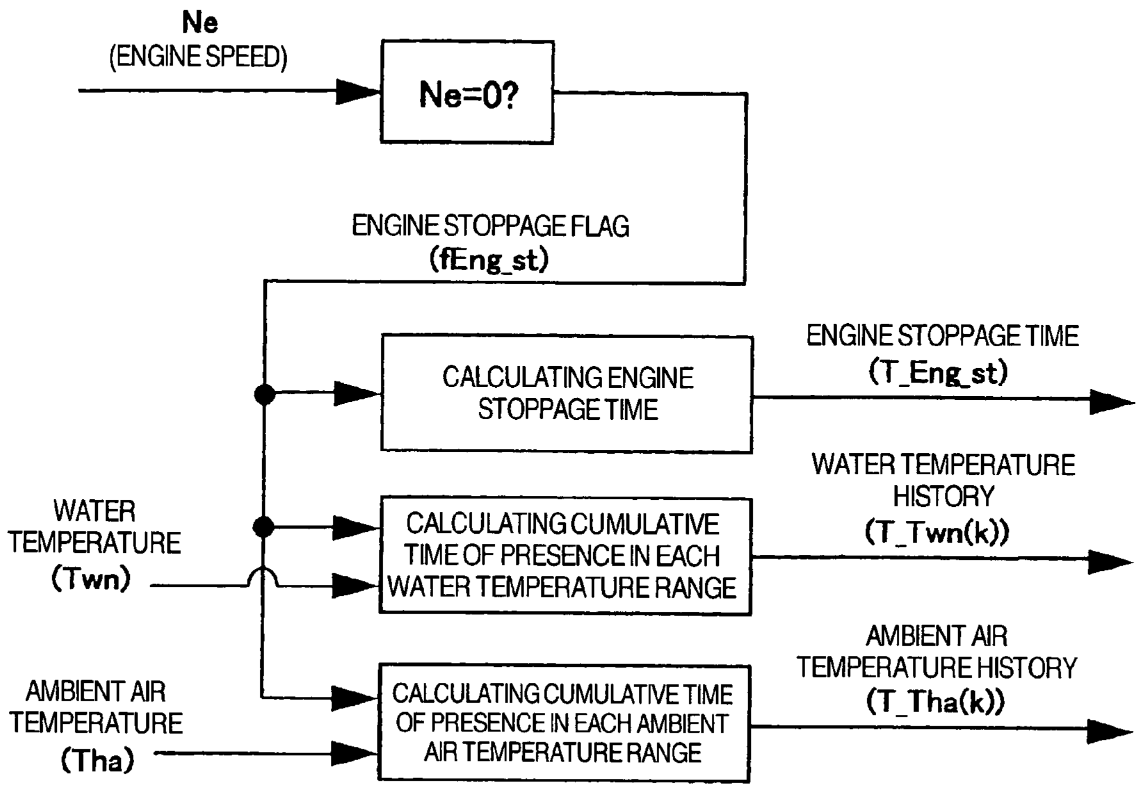
FIG. 28 is a diagram for explaining a calculating means of history during stoppage time.

This calculating unit 310 performs an arithmetic operation related to history of the environment, such ass water temperature and intake temperature during engine stoppage. More specifically, as shown in FIG. 28, when the engine is at rest, in other words, the engine revolution number is zero, the calculating means calculates engine stoppage time, and calculation of cumulative time of presence of each water temperature range and each intake air temperature range. The cumulative time of presence of each of water temperature ranges is, for example, cumulative time of water temperature staying in a range of 0° C. to 10° C. or in a range of 10° C. to 20° C. during engine stoppage, and this data is used to take into consideration the effect factors that the fuel remaining in the intake passage has on the evaporation rate.

<Residual Fuel Quantity and Fuel Property Detecting Unit 1190 (FIG. 29)>

Figure 29:
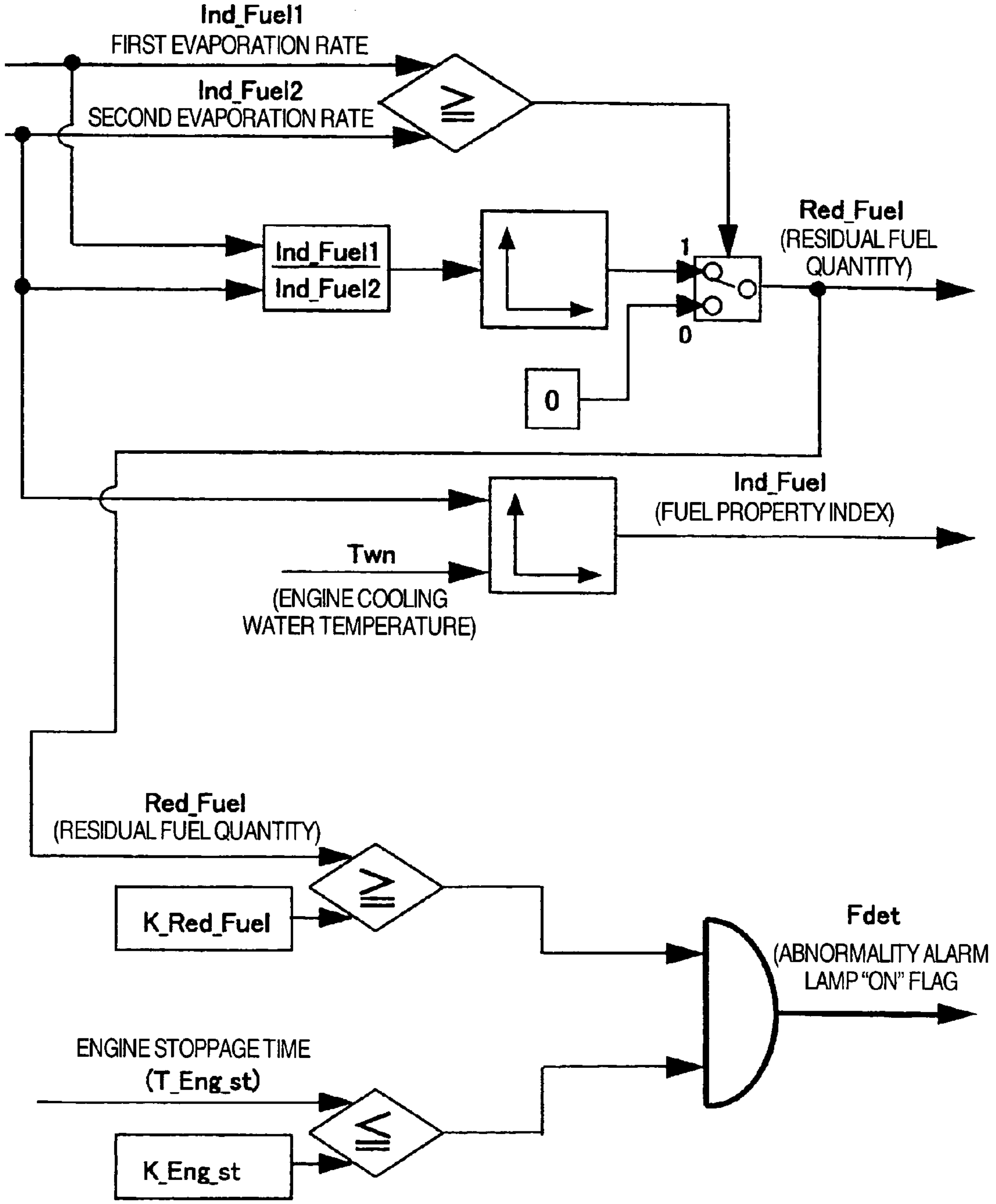
FIG. 29 is a diagram for explaining an example of a detecting means of a residual fuel quantity and a fuel property in the third embodiment.

This unit 390 detects (calculates) a residual fuel quantity and a fuel property. To be more specific, as shown in FIG. 29, when a first evaporation rate is greater than a second evaporation rate, a residual fuel quantity Red_Fuel is obtained from a ratio between Ind_Fuel1 and Ind_Fuel2 by referring to a map. A fuel property index Ind_Fuel is obtained from Ind_Fuel2 and Twn by referring to the map.

Figure 30:
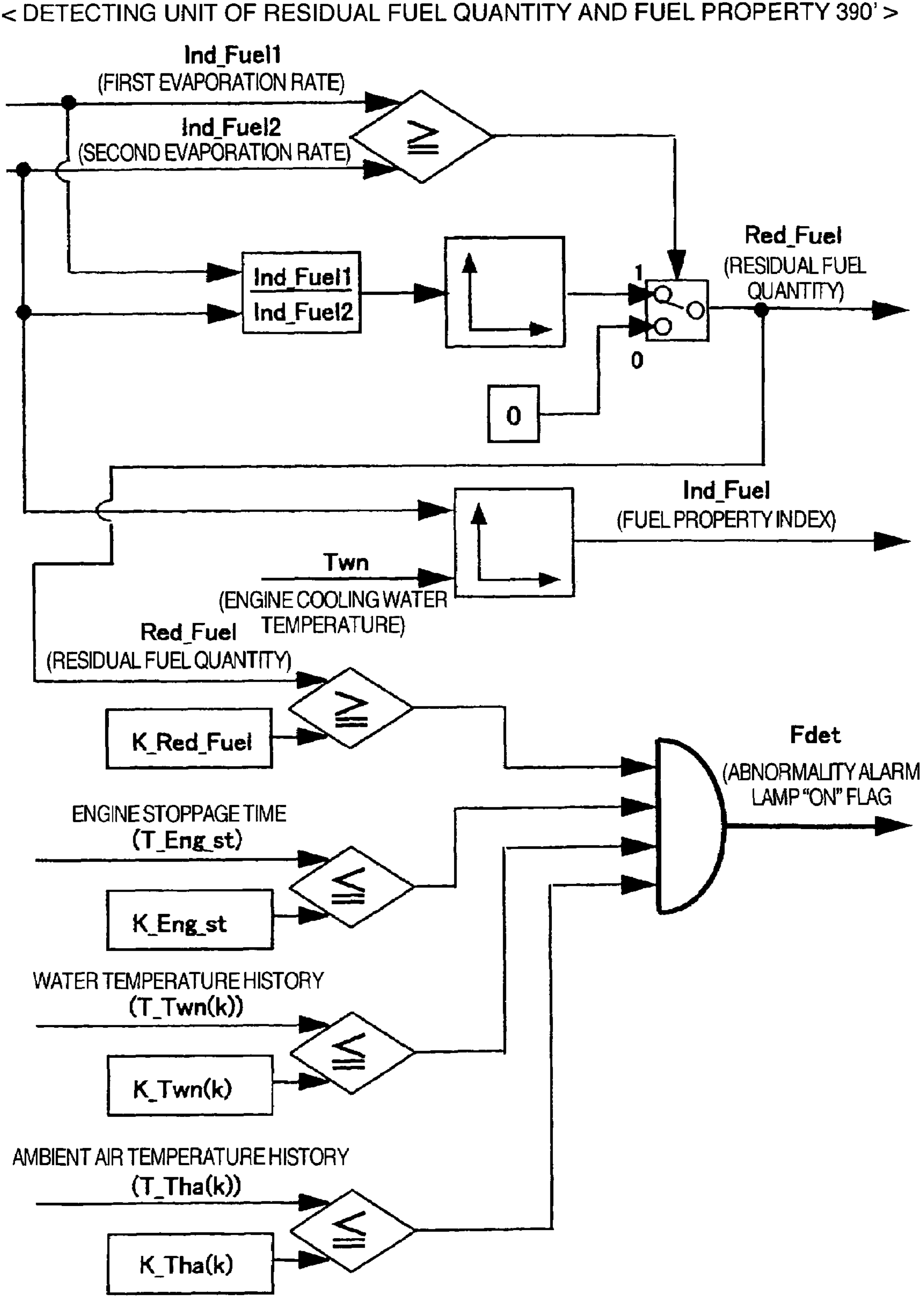
FIG. 30 is a diagram for explaining another example of a detecting means of a residual fuel quantity and a fuel property in the third embodiment.

Moreover, when a residual fuel quantity (Red_Fuel) is greater than or equal to a predetermined value K_Red_Fuel and engine stoppage time (T_Eng_st) is less than or equal to a predetermined value K_Eng_st, owing to a deterioration in oil-tightness of the fuel injection valve or abnormality of the canister purge valve, for example, the abnormality alarm lamp 127 turns ON. Or, as shown in FIG. 30, which indicates another example of residual oil quantity and fuel property detecting unit 390', abnormality may be notified in consideration of temperature history during engine stoppage.

The fuel evaporation detected by the first fuel evaporation rate detecting unit 150 is apparently higher than the second fuel evaporation rate detecting unit 180 by an amount corresponding to the residual fuel quantity. However, if this relation is reversed, in other words, if the fuel evaporation rate detected by the first fuel evaporation rate detecting unit 150 is apparently lower than the fuel evaporation detected by the second fuel evaporation rate detecting unit 180, it is possible to make an arrangement so that a decision can be made that an engine abnormality has occurred which leads to a deterioration of the fuel evaporation rate, and abnormality is notified.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An engine control apparatus comprising:

means for detecting or estimating a burned fuel quantity of an engine; and means for separately detecting a burned fuel quantity of fuel supplied from a fuel injection valve after starting of the engine and a burned quantity of fuel other than said burned fuel quantity supplied from said fuel injection valve after starting of the engine, based on said burned fuel quantity of the engine detected or estimated by said detecting or estimating means, wherein said burned fuel quantity detecting or estimating means includes:

a first detecting means for detecting an initial burned fuel quantity or a fuel evaporation rate, and a second detecting means for detecting a second burned fuel quantity or a fuel evaporation rate, and wherein said means for separately detecting includes means for estimating a burned quantity of fuel other than a fuel supplied from said fuel injection valve on the basis of detection results from said first and second detecting means.

2. The engine control apparatus according to claim 1, wherein said means for separately detecting detects a residual fuel quantity existing in a cylinder, an air-intake passage, and an exhaust passage before the engine is started as a burned quantity of fuel other than a fuel supplied from said fuel injection valve.

3. The engine control apparatus according to claim 1, further comprising:

means for calculating a parameter related to engine control on the basis of a detection result of said means for separately detecting.

4. The engine control apparatus according to claim 2, wherein a fuel injection quantity at the start of the engine is set on the basis of said residual fuel quantity.

5. The engine control apparatus according to claim 2, further comprising means for notifying said detected residual fuel quantity and/or a fuel property.

6. The engine control apparatus according to claim 2, further comprising means for deciding and notifying that an abnormality has occurred in the fuel system when an elapsed time from a stoppage to a start of the engine is less than or equal to a predetermined value and said detected residual fuel quantity is greater than or equal to a predetermined value.

7. An engine control apparatus, comprising:

means for detecting or estimating a burned fuel quantity of an engine;

means for separating said detected or estimated burned fuel quantity and separately detecting a burned fuel quantity of fuel supplied from a fuel injection valve and a burned quantity of fuel other than said burned fuel quantity supplied from said fuel injection valve, wherein said burned fuel quantity detecting or estimating means includes;

a first detecting means for detecting an initial burned fuel quantity or a fuel evaporation rate, and a second detecting means for detecting a second burned fuel quantity or a fuel evaporation rate, and wherein said separating and detecting means includes means for estimating a burned quantity of fuel other than a fuel supplied from said fuel injection valve on the basis of detection results from said first and second detecting means.

8. The engine control apparatus according to claim 7, wherein said separating and detecting means estimates a burned quantity of fuel other than a fuel supplied from said fuel injection valve on the basis of a difference or a ratio between detection results of said first and second detecting means.

9. The engine control apparatus according to claim 7, wherein said separating and detecting means includes means for estimating a fuel property on the basis of a detection result of said first or second detecting means.

10. The engine control apparatus according to claim 9, wherein said separating and detecting means obtains a fuel property on the basis of said second fuel evaporation rate when said second fuel evaporation rate is lower than said first fuel evaporation rate, and obtains a residual fuel quantity on the basis of a difference or a ratio between said first fuel evaporation rate and said second fuel evaporation rate.

11. The engine control apparatus according to claim 7, wherein said first detecting means uses a period where there are both effects of change in burned fuel quantity caused by said residual fuel and effects of change in burned fuel quantity caused by said fuel property is used as a detection period, and wherein said second detecting means uses a period where there are effects of change in burned fuel quantity caused by said fuel property as a detection period.

12. The engine control apparatus according to claim 7, wherein said first detecting means detects a burned fuel quantity or a fuel evaporation rate within a predetermined elapsed time after the engine is started, and said second detecting means detects a burned fuel quantity or a fuel evaporation rate after a predetermined elapsed time from the time the engine is started.

13. The engine control apparatus according to claim 12, wherein in said first and second detecting means, the moment the engine is started, which is a start point of measuring an elapsed time, is set at a time point when the engine speed is greater than zero.

14. The engine control apparatus according to claim 7, wherein said first detecting means detects a burned fuel quantity or a fuel evaporation rate when an engine cooing water temperature is less than or equal to a predetermined temperature A, and said second detecting means detects a burned fuel quantity or a fuel evaporation rate when said cooling water temperature is less than or equal to a predetermined cooling water temperature B.

15. The engine control apparatus according to claim 7, wherein said first or second detecting means detects a burned fuel quantity or a fuel evaporation rate on the basis of the engine speed.

16. The engine control apparatus according to claim 15, wherein said first detecting means detects a burned fuel quantity or a fuel evaporation rate on the basis of an integrated value of the engine speed and/or a maximum value of the engine speed in a period from when the engine speed is greater than or equal to a predetermined value C until the engine speed is greater than or equal to a predetermined value D.

17. The engine control apparatus according to claim 15, wherein said second fuel evaporation rate detecting means detects a burned fuel quantity or a fuel evaporation rate on the basis of change in the engine speed.

18. The engine control apparatus according to claim 7, wherein said first or second detecting means detects a burned fuel quantity or a fuel evaporation rate on the basis of an exhaust component of the engine.

19. The engine control apparatus according to claim 18, wherein said first or second detecting means detects a burned fuel quantity or a fuel evaporation rate on the basis of a concentration of HC or CO as exhaust components of the engine.

20. The engine control apparatus according to claim 18, wherein said first or second detecting means detects a burned fuel quantity or a fuel evaporation rate on the basis of an air/fuel ratio to represent an exhaust component of the engine.

21. The engine control apparatus according to claim 18, wherein said second detecting means includes means for directly or indirectly detecting a response characteristic of from fuel injection to the engine up to said exhaust component, and detects a burned fuel quantity or a fuel evaporation rate on the basis of said response characteristic.

22. The engine control apparatus according to claim 21, wherein said response characteristic is detected in a time domain such as step response time.

23. The engine control apparatus according to claim 21, wherein said response characteristic is detected in a frequency domain such as a frequency response characteristic.

24. The engine control apparatus according to claim 7, wherein said first detecting means detects a burned fuel quantity or a fuel evaporation rate on the basis of time T0 from when the engine speed becomes greater than or equal to a predetermined value C until the engine speed becomes greater than or equal to a predetermined value D.

25. The engine control apparatus according to claim 7, wherein said first detecting means detects a burned fuel quantity or a fuel evaporation rate on the basis of time T1 from when an initial combustion of the engine occurs until the engine speed reaches a predetermined number.

26. The engine control apparatus according to claim 7, wherein said first detecting means detects a burned fuel quantity or a fuel evaporation rate on the basis of time T2 from initial combustion of the engine until the engine speed settles in a predetermined range and becomes stable.

27. The engine control apparatus according to claim 7, wherein said second detecting means detects a burned fuel quantity or a fuel evaporation rate after the engine speed reaches a predetermined number of revolutions after the occurrence of the initial combustion of the engine.

28. The engine control apparatus according to claim 7, wherein said second detecting means detects a burned fuel quantity or a fuel evaporation rate after the engine speed settles in a predetermined range and becomes stable.

29. The engine control apparatus according to claim 7, further comprising means for obtaining a fuel property on the basis of a second fuel evaporation rate when a second fuel evaporation rate detected by said second detecting means is higher than a first fuel evaporation rate detected by said first detecting means and deciding that engine abnormality has occurred and will aggravate the fuel evaporation rate on the basis of a difference or a ratio between said first fuel evaporation rate and said second fuel evaporation rate.

30. The engine control apparatus according to claim 29, wherein when an engine abnormality occurred, which will aggravate said fuel evaporation rate, said deciding means is adapted to decide that the fuel intake efficiency is aggravated due to fuel deposits formed in the intake valve and take countermeasures.

31. The engine control apparatus according to claim 7, wherein said first or second detecting means directly detects a fuel property.

32. An automobile, comprising:

an engine; and an engine control apparatus, the engine control apparatus including:

means for detecting or estimating a burned fuel quantity of an engine; and means for separately detecting a burned fuel quantity of fuel supplied from a fuel injection valve after starting of the engine and a burned quantity of fuel other than said burned fuel quantity supplied from said fuel injection valve after starting of the engine, based on said burned fuel quantity of the engine detected or estimated by said detecting or estimating means, wherein said burned fuel quantity detecting or estimating means includes;

a first detecting means for detecting an initial burned fuel quantity or a fuel evaporation rate; and a second detecting means for detecting a second burned fuel quantity or a fuel evaporation rate, and wherein said means for separately detecting includes means for estimating a burned quantity of fuel other than a fuel supplied from said fuel injection valve on the basis of detection results from said first and second detecting mean.

* * * * *

UNITED STATES PATENT AND TRADEMARK OFFICE

CERTIFICATE OF CORRECTION

PATENT NO. : 7,664,591 B2
APPLICATION NO. : 11/476798
DATED : February 16, 2010
INVENTOR(S) : Nakagawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 216 days.

Signed and Sealed this

Twenty-eighth Day of December, 2010

David J. Kappos
*Director of the United States Patent and Trademark Office*